United States Patent
Sutterfield et al.

(10) Patent No.: US 9,435,266 B2
(45) Date of Patent: Sep. 6, 2016

(54) SEALS FOR A GAS TURBINE ENGINE

(71) Applicant: Rolls-Royce North American Technologies, Inc., Indianapolis, IN (US)

(72) Inventors: David L. Sutterfield, Greenwood, IN (US); Gregory W.P. Zeaton, Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 197 days.

(21) Appl. No.: 14/137,400

(22) Filed: Dec. 20, 2013

(65) Prior Publication Data

US 2014/0265161 A1    Sep. 18, 2014

Related U.S. Application Data

(60) Provisional application No. 61/801,365, filed on Mar. 15, 2013.

(51) Int. Cl.
  *F02C 7/28* (2006.01)
  *F16J 15/08* (2006.01)
  *F16J 15/10* (2006.01)
  *F02K 1/80* (2006.01)

(52) U.S. Cl.
  CPC ............. *F02C 7/28* (2013.01); *F02K 1/805* (2013.01); *F16J 15/0812* (2013.01); *F16J 15/104* (2013.01); *Y02T 50/672* (2013.01); *Y10T 29/49297* (2015.01)

(58) Field of Classification Search
  CPC .... F16J 15/025; F16J 15/062; F16J 15/0812; F16J 15/104; F02C 7/28; F02K 1/805; Y10T 29/49297; Y02T 50/672

USPC .......................................................... 277/642
  See application file for complete search history.

(56) References Cited

U.S. PATENT DOCUMENTS

| 2,657,438 | A | * | 11/1953 | Spraragen | 49/492.1 |
| 2,898,648 | A | * | 8/1959 | Bright | 49/490.1 |
| 5,193,823 | A | * | 3/1993 | Janich | 277/345 |

(Continued)

FOREIGN PATENT DOCUMENTS

| DE | 10053304 A1 | 5/2002 |
| EP | 1591725 A2 | 11/2005 |

OTHER PUBLICATIONS

International Search Report for PCT International Application Serial No. PCT/US2013/077027, completed Mar. 15, 2013, (12 pages).

(Continued)

*Primary Examiner* — Kristina Fulton
*Assistant Examiner* — Nathan Cumar
(74) *Attorney, Agent, or Firm* — Barnes & Thornburg LLP

(57) ABSTRACT

A sealing assembly may include a support, an engine component, and a seal. The engine component may be mounted relative to the support to define a gap between the engine component and the support. The seal may be arranged between the support and the engine component to block gasses from passing through the gap. The seal may be adapted to compress and expand to fill the gap during expansion and contraction of the adjacent components that occurs during operation of a gas turbine engine including the sealing assembly.

18 Claims, 15 Drawing Sheets

(56) References Cited

U.S. PATENT DOCUMENTS

| | | |
|---|---|---|
| 6,679,062 B2 | 1/2004 | Conete et al. |
| 7,347,425 B2 | 3/2008 | James |
| 8,322,976 B2 | 12/2012 | Chila et al. |
| 2002/0184890 A1 | 12/2002 | Camy et al. |
| 2002/0184892 A1 | 12/2002 | Calvez et al. |
| 2004/0032089 A1 | 2/2004 | Conete et al. |
| 2004/0154303 A1* | 8/2004 | Mitchell ............... F01D 11/005 60/772 |
| 2005/0242525 A1* | 11/2005 | Dahlke .................... F23M 5/02 277/605 |
| 2008/0063514 A1* | 3/2008 | Durocher ................ F01D 9/023 415/138 |
| 2009/0199565 A1 | 8/2009 | Brown et al. |
| 2010/0199583 A1* | 8/2010 | Behrens ................. E04B 1/948 52/396.01 |

OTHER PUBLICATIONS

Replacement Parts for Gas Turbine Auxiliary Systems, Dec. 31, 2012, pp. 1-14, Retrieved from URL: http://www.braden.com/CM_Files/2013-20981BradenPartsBrochureTab1.pdf.

* cited by examiner

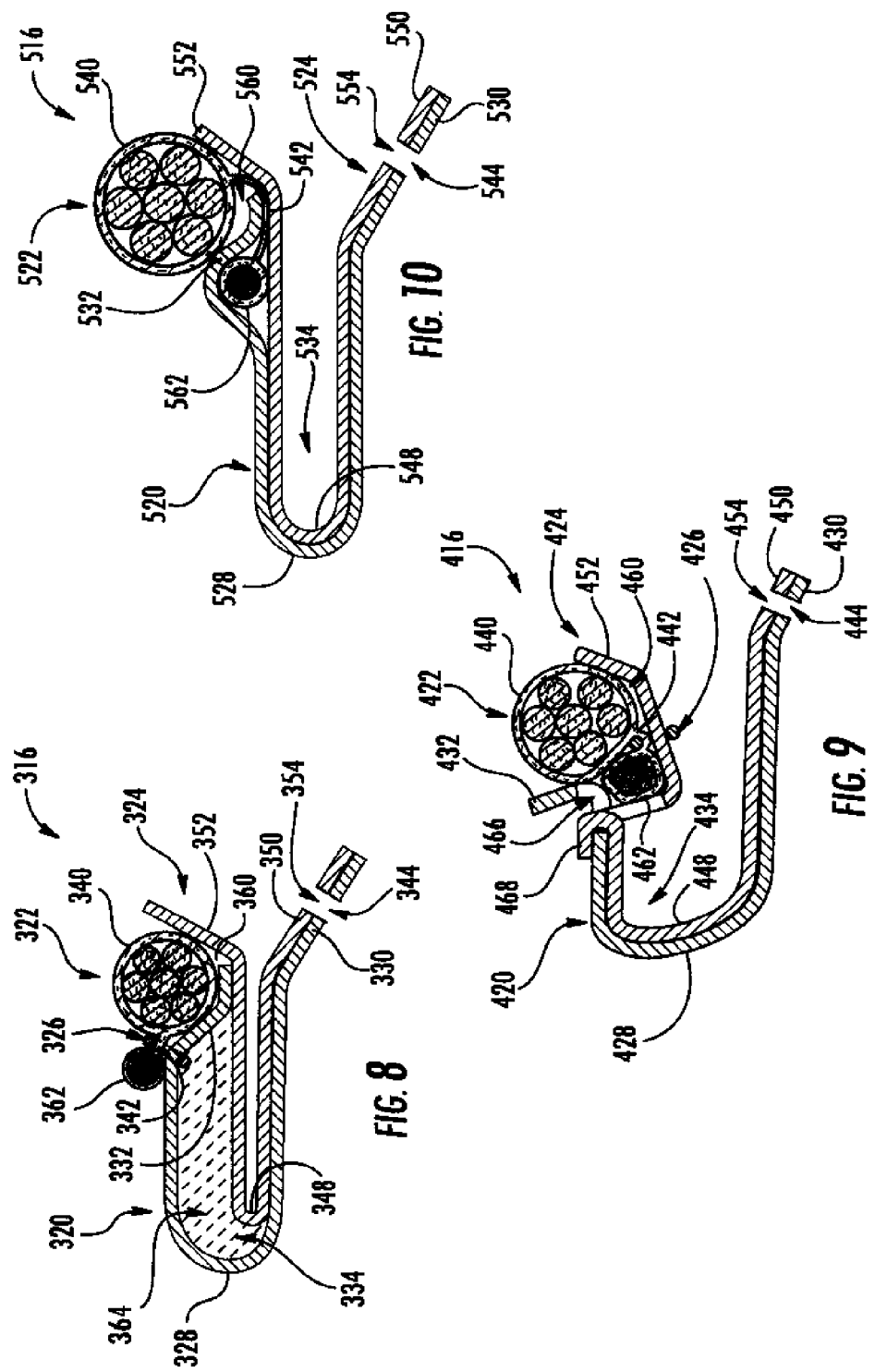

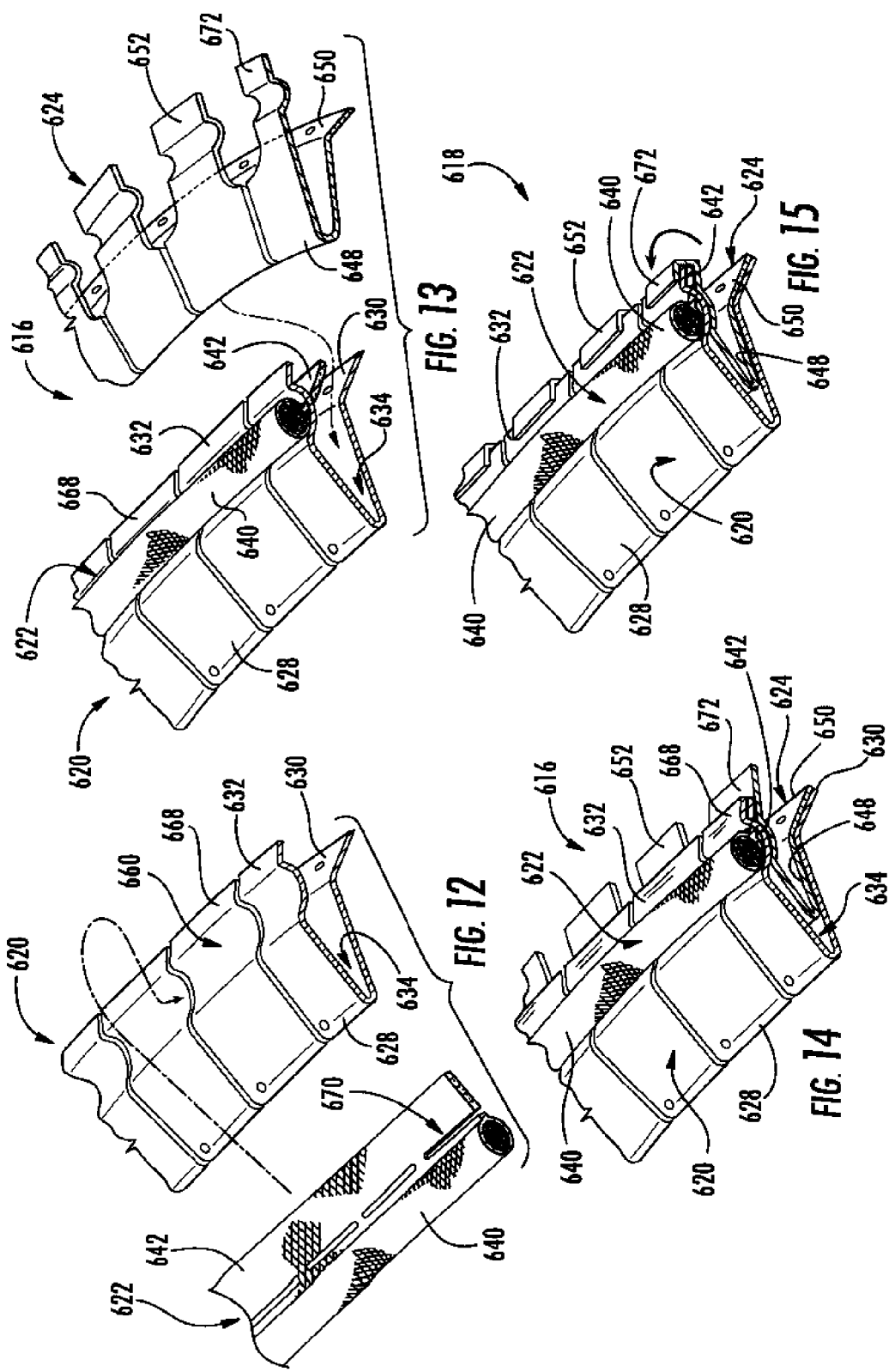

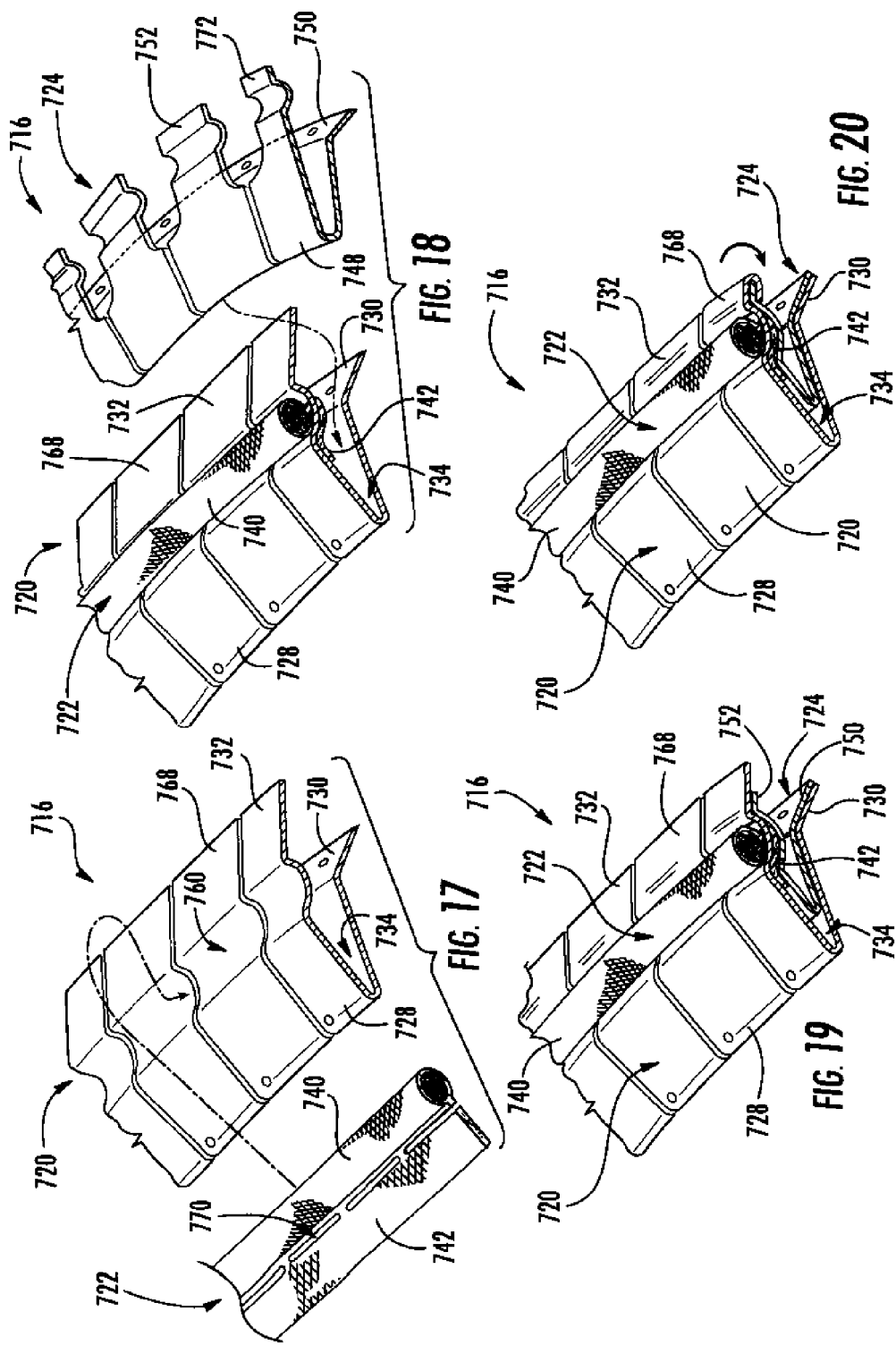

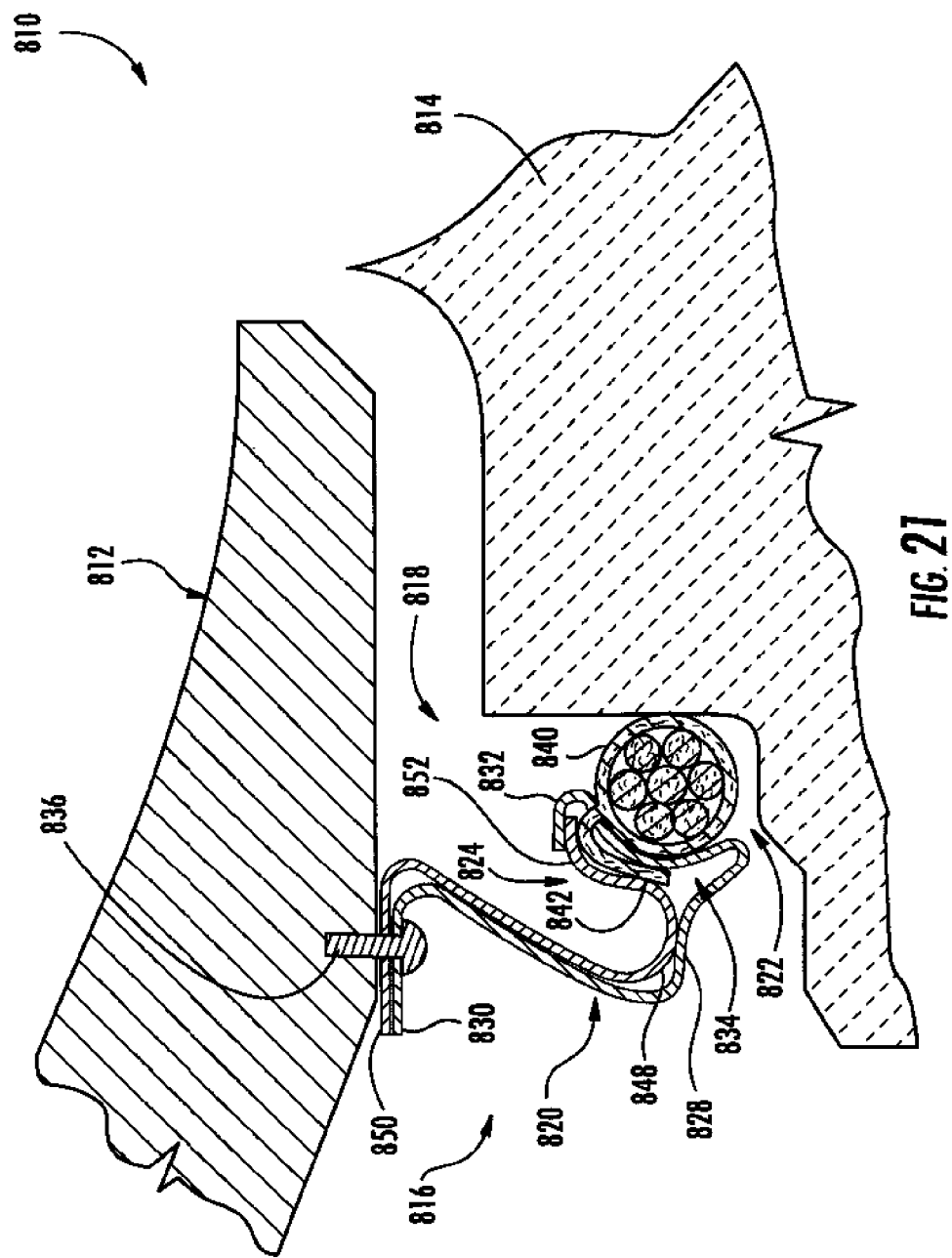

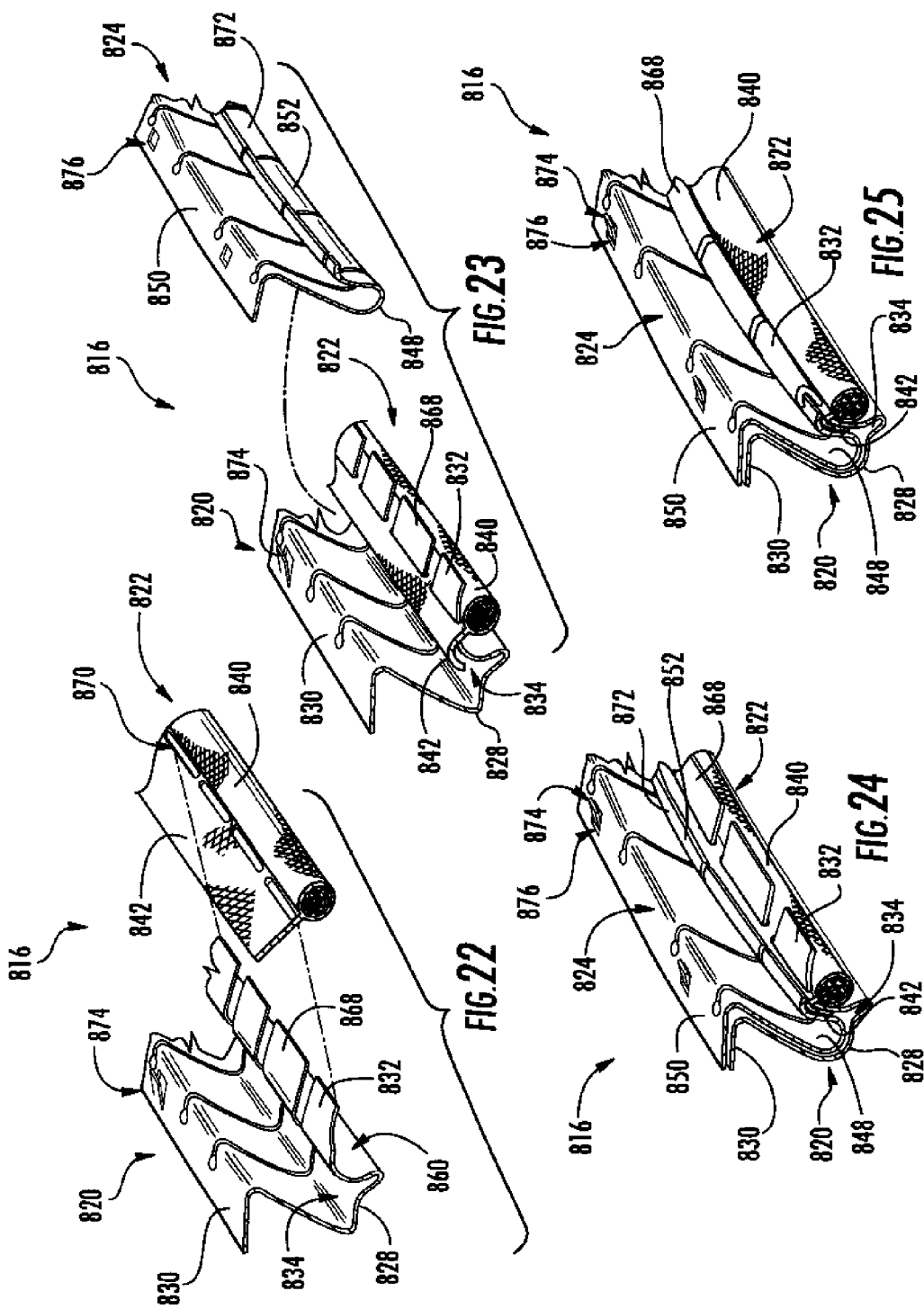

SEALS FOR A GAS TURBINE ENGINE

CROSS REFERENCE TO RELATED APPLICATIONS

This application claims priority to and the benefit of U.S. Provisional Patent Application No. 61/801,365, filed 15 Mar. 2013, the disclosure of which is now expressly incorporated herein by reference.

STATEMENT REGARDING FEDERALLY SPONSORED RESEARCH OR DEVELOPMENT

The present application was with the United States government support under Contract No. N00014-04-D-0068, awarded by the U.S. government. The United States government may have certain rights in the present application.

FIELD OF THE DISCLOSURE

The present disclosure relates generally to gas turbine engines. More specifically, the present disclosure relates to seals used in gas turbine engines.

BACKGROUND

Gas turbine engines are used to power aircraft, watercraft, power generators, and the like. Adjacent components in a gas turbine engine are often separated by a small gap. The small gap allows for variations in manufacturing tolerance of the adjacent components and for expansion/contraction of the adjacent components that occurs during operation of the gas turbine engine. Expansion and contraction of the adjacent components is typically caused by the selection of different materials for each component and by different temperatures experienced by each component.

The small gaps between adjacent components may be sealed to prevent the leakage of air through the gaps during operation of the turbine engine. Seals used to block the leakage of air through the small gaps are sometimes designed to account for changes in the dimension of the gap to be closed. Rope seals are a type of seal sometimes considered for blocking gaps between adjacent components. In some situations however, rope seals may not provide enough compliance and/or resilience to account for the amount of change in the dimension of the gap to be closed.

SUMMARY

The present disclosure may comprise one or more of the following features and combinations thereof.

A series of seals for use in a gas turbine engine are disclosed in this paper. Specifically, the seals disclosed in this paper may be adapted for use in closing a gap formed between a relatively-low temperature support component and a relatively-high temperature engine component. Each seal may include a mount and a ceramic rope gasket that cooperate to block gasses from passing through the gap between the support component and the engine component. The mount may be coupled to the support component and may hold the ceramic rope gasket in place. The ceramic rope gasket may be adapted to withstand relatively-high temperatures and may contact the engine component while the mount is maintained in spaced-apart relation to the engine component. Thus, the ceramic rope gasket may insulate the mount and the support component from the relatively-high temperatures of the engine component.

In illustrative embodiments, the seals may be annular and extend around the centerline of the gas turbine engine in which they are used. Some illustrative seals may include a mount ring, a tadpole gasket, and a retainer ring. The mount ring may be coupled to the support component and may be spaced apart from the engine component. The tadpole gasket may be made from ceramic materials and may be held in contact with the engine component by the mount ring. The tadpole gasket may insulate the mount ring, retainer ring, and the support component from the relatively high-temperatures of the engine component. The retainer ring may be arranged to extend into a retention channel formed by the mount ring to trap a body of the tadpole gasket in the retention channel so that the tadpole gasket is coupled to the mount ring while a compressible head of the tadpole gasket is pushed into contact with the engine component.

According to an aspect of the present disclosure, a sealing assembly may include a support having a support-seal surface, an engine component having a component-seal surface, and a seal. The engine component may be mounted so that the component-seal surface is arranged in spaced-apart confronting relation with the support-seal surface to define a gap between the support and the engine component that grows and shrinks based on the temperature of the support and the engine component.

The seal may be adapted to block gasses from passing through the gap between the support and the engine component. The seal may include a mount ring, a ceramic tadpole gasket, and a retainer ring. The mount ring may be coupled to the support and spaced apart from the engine component. The ceramic tadpole gasket may have a compressible head held in contact with the engine component by the mount ring and a flat body extending from the compressible head into a retention channel formed by the mount ring. The retainer ring may be arranged to extend into the retention channel of the mount ring to trap the flat body of the tadpole gasket in the retention channel formed by the mount ring so that the tadpole gasket is coupled to the mount ring.

In some embodiments, the mount ring may include a spring portion having a U-shaped cross-section. The spring portion may be configured to push the compressible head of the ceramic tadpole gasket into contact with the engine component.

In some embodiments, the mount ring may include a coupler portion extending from the spring portion that is coupled to the support by fasteners that extend through the coupler portion and into the support. In some embodiments, the retainer ring may include a coupler portion that overlaps the coupler portion of the support and through which the fasters extend.

In some embodiments, the mount ring may include a curved pusher portion coupled to the spring portion. The curved pusher portion may extend around a portion of the compressible head included in the tadpole gasket. The curved pusher portion may engage the compressible head.

In some embodiments, the retainer ring may include a keeper portion arranged to extend outside the retention channel and block the compressible head of the tadpole gasket from movement away from the curved pusher portion of the mount ring. In some embodiments, the curved pusher portion of the mount ring and the keeper portion of the retainer ring may cooperate to define a gasket channel sized to receive a portion of the compressible head and arranged to open toward the component-seal surface of the engine component.

In some embodiments, the retainer ring may include a spring portion having a U-shaped cross-section and may be arranged to nest inside the spring portion of the mount ring so that the flat body of the tadpole gasket is trapped between the spring portion of the retainer ring and the spring portion of the mount ring. In some embodiments, the sealing assembly may further include a staple extending through the flat body of the tadpole gasket and at least one of the mount ring and the retainer ring.

In some embodiments, the support-seal surface and the component-seal surface may be continuous. In some embodiments, the support may be made from a metallic material and the engine component may be made from a composite material.

According to another aspect of the disclosure, a seal adapted for use in a gas turbine engine may include a mount ring, a ceramic tadpole gasket, and a retainer ring. The mount ring may be formed to include a retention channel. The ceramic tadpole gasket may have a compressible head and a flat body extending from the compressible head into the retention channel formed by the mount ring. The retainer ring may be arranged in the retention channel of the mount ring and may be sized to trap the flat body of the tadpole gasket in the retention channel formed by the mount ring so that the tadpole gasket is coupled to the mount ring.

In some embodiments, the mount ring may include a spring portion having a U-shaped cross-section that forms the retention channel. In some embodiments, the mount ring may include a coupler portion extending from the spring portion. The coupler portion may be adapted to couple to a support by fasteners that extend through the coupler portion.

In some embodiments, the retainer ring may include a coupler portion that overlaps the coupler portion of the support and through which the fasters extend. In some embodiments, the mount ring may include a curved pusher portion coupled to the spring portion. The curved pusher portion may extend around a portion of the compressible head included in the tadpole gasket. The curved pusher portion may be arranged to engage the compressible head.

In some embodiments, the retainer ring may include a keeper portion arranged to extend outside the retention channel and block the compressible head of the tadpole gasket from movement away from the curved pusher portion of the mount ring. In some embodiments, the mount ring and retainer ring may be annular. The curved pusher portion of the mount ring and the keeper portion of the retainer ring may cooperate to define an annular gasket channel sized to receive a portion of the compressible head and arranged to open radially outward.

In some embodiments, the mount ring and the retainer ring may be annular. The retainer ring may include a spring portion having a U-shaped cross-section arranged to nest inside the spring portion of the mount ring so that the flat body of the tadpole gasket is trapped between the spring portion of the retainer ring and the spring portion of the mount ring.

In some embodiments, the seal may further include a staple extending through the flat body of the ceramic tadpole gasket and at least one of the mount ring and the retainer ring. In some embodiments, the curved pusher portion of the mount ring may be curved to form a staple channel. The staple may extend through the flat body of the ceramic tadpole gasket and the curved pusher portion into the staple channel. The spring portion of the retainer ring may be arranged to nest inside the spring portion of the mount ring to close the staple channel.

In some embodiments, the seal may further include ceramic paper located between the mount ring and the retainer ring. In some embodiments, the ceramic tadpole gasket may further include a retention tail coupled to the flat body opposite the compressible head.

According to another aspect of the present disclosure, a method of assembling a seal for a gas turbine engine may include a number of operations. The method may include positioning a flat body included in a ceramic tadpole gasket into a retention channel formed by a mount ring; the ceramic tadpole gasket including a compressible head and the flat body, and the flat body extending from the compressible head; inserting a retainer ring into the retention channel formed by the mount ring to trap the flat body of the ceramic tadpole gasket in the retention channel so that the ceramic tadpole gasket is coupled to the mount ring and the compressible head of the ceramic tadpole gasket is held in position by the mount ring. In some embodiments, the method may further include fastening the flat body of the ceramic tadpole gasket to the mount ring with a staple.

These and other features of the present disclosure will become more apparent from the following description of the illustrative embodiments.

BRIEF DESCRIPTION OF THE FIGURES

FIG. 8 is cross-sectional elevation view of a third embodiment of a seal adapted to be used in the sealing assembly of FIG. 1, the seal may include a mount ring formed to include a retainer channel, a ceramic tadpole gasket, insulative paper, a retainer ring received in the retainer channel of the mount ring to trap the insulative paper in the retainer channel, and a staple extending through the mount ring and the ceramic tadpole gasket to couple the ceramic tadpole gasket to the mount ring;

FIG. 9 is cross-sectional elevation view of a fourth embodiment of a seal adapted to be used in the sealing assembly of FIG. 1, the seal may include a mount ring formed to include a retainer channel, a ceramic tadpole gasket, a retainer ring received in the retainer channel of the mount ring, and a staple extending through the retainer ring and the ceramic tadpole gasket to couple the ceramic tadpole gasket to the retainer ring;

FIG. 10 is cross-sectional elevation view of a fifth embodiment of a seal adapted to be used in the sealing assembly of FIG. 1, the seal may include a mount ring formed to include a retainer channel, a ceramic tadpole gasket extending into the retainer channel, and a retainer ring received in the retainer channel of the mount ring to trap the ceramic tadpole gasket in the retainer channel;

FIGS. 12-15 are a series of views showing a method for assembling the sixth embodiment of the seal shown in FIG. 11;

FIG. 12 is a perspective view of the mount ring and the ceramic tadpole gasket included in the seal and suggesting that the ceramic tadpole gasket may be adapted to be supported by the mount ring and extend along the mount ring;

FIG. 13 is a perspective view of the components of the seal after the ceramic tadpole gasket has been coupled to the mount ring and suggesting that the retainer ring may be adapted to be received in the retainer channel formed by the mount ring to trap the ceramic tadpole gasket between the mount ring and retainer ring;

FIG. 14 is a perspective view of the seal showing the ceramic tadpole gasket has been coupled to the mount ring and the retainer ring has been received in the retainer channel formed by the mount ring to trap the ceramic tadpole gasket between the mount ring and retainer ring;

FIG. 15 is a perspective view of the seal showing the ceramic tadpole gasket has been coupled to the mount ring and the retainer ring has been received in the retainer channel formed by the mount ring to trap the ceramic tadpole gasket between the mount ring and retainer ring and further showing a portion of the retainer ring folded over the mount ring to block the ceramic tadpole gasket from moving relative to the mount ring;

FIGS. 17-20 are a series of views showing method of assembling the seventh embodiment of the seal shown in FIG. 16;

FIG. 17 is a perspective view of the mount ring and the ceramic tadpole gasket included in the seal and suggesting that the ceramic tadpole gasket may be adapted to be supported by the mount ring and extend into the retainer channel formed by the mount ring;

FIG. 18 is a perspective view of the components of the seal after the ceramic tadpole gasket has been coupled to the mount ring and suggesting that the retainer ring may be adapted to be received in the retainer channel formed by the mount ring to trap the ceramic tadpole gasket in the retainer channel;

FIG. 19 is a perspective view of the seal showing the ceramic tadpole gasket has been coupled to the mount ring and the retainer ring has been received in the retainer channel formed by the mount ring to trap the ceramic tadpole gasket in the retainer channel;

FIG. 20 is a perspective view of the seal showing the ceramic tadpole gasket has been coupled to the mount ring and the retainer ring has been received in the retainer channel formed by the mount ring to trap the ceramic tadpole gasket in the retainer channel and further showing a portion of the mount ring folded over the retainer ring to block the ceramic tadpole gasket from moving relative to the mount ring;

FIG. 21 is cross-section elevation view of another embodiment of a portion of a sealing assembly, the sealing assembly may include a support, an engine component spaced from the support annularly, and an eighth embodiment of a seal arranged between the support and the engine component to block gasses from passing through the gap and to insulate the support from the relatively high-temperature engine component;

FIGS. 22-25 are a series of views showing a method of assembling the eighth embodiment of the seal shown in FIG. 21;

FIG. 22 is a perspective view of a mount ring and a ceramic tadpole gasket included in the seal and suggesting that the ceramic tadpole gasket may be adapted to be supported by the mount ring and extend into a retainer channel formed by the mount ring;

FIG. 23 is a perspective view of the components of the seal after the ceramic tadpole gasket has been coupled to the mount ring and suggesting that the retainer ring may be adapted to be received in the retainer channel formed by the mount ring to trap the ceramic tadpole gasket in the retainer channel;

FIG. 24 is a perspective view of the seal showing the ceramic tadpole gasket coupled to the mount ring and the retainer ring received in the retainer channel formed by the mount ring to trap the ceramic tadpole gasket in the retainer channel;

FIG. 25 is a perspective view of the seal showing the ceramic tadpole gasket coupled to the mount ring and the retainer ring received in the retainer channel formed by the mount ring to trap the ceramic tadpole gasket in the retainer channel and further showing a portion of the mount ring may be folded over the retainer ring to block the ceramic tadpole gasket from moving relative to the mount ring;

DETAILED DESCRIPTION OF THE ILLUSTRATIVE EMBODIMENTS

Figure 1:
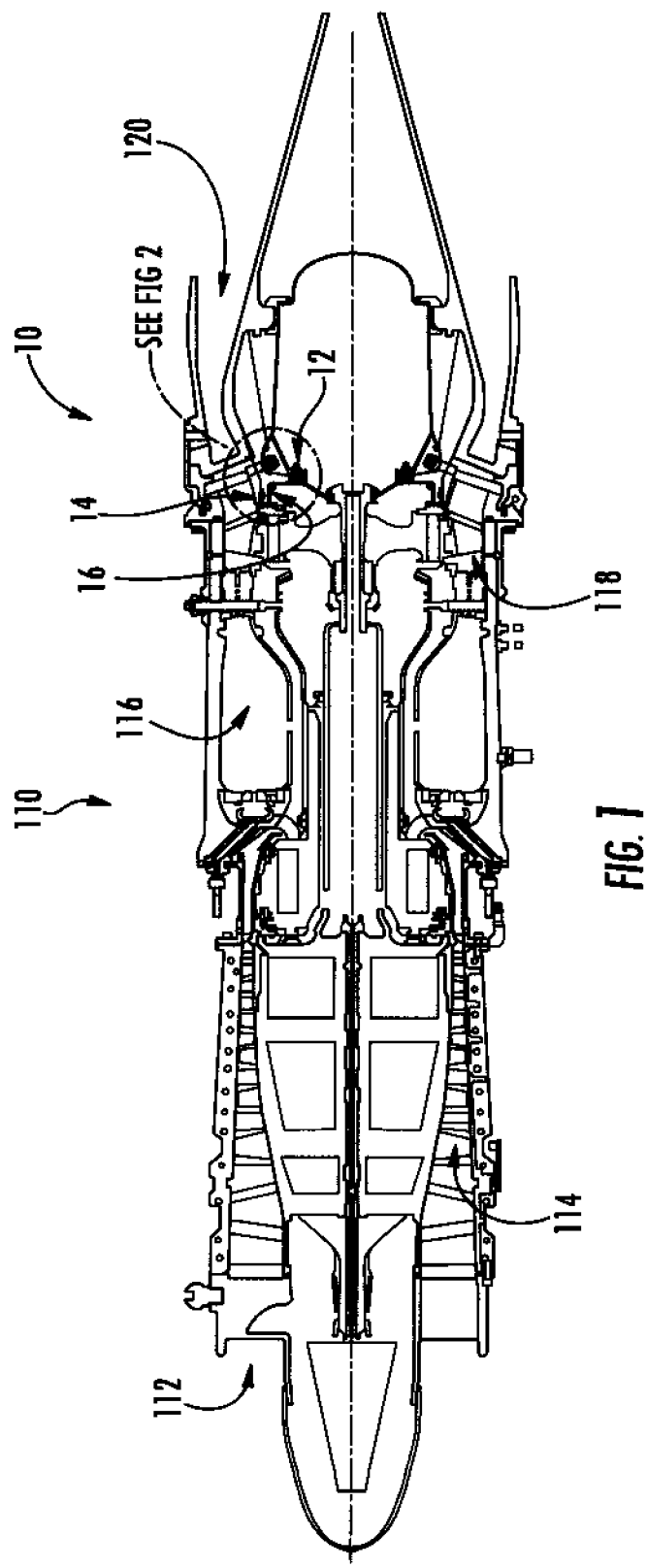
FIG. 1 is a cross-sectional view of a gas turbine engine including a sealing assembly positioned in an exhaust portion of the gas turbine engine, the sealing assembly may be adapted to experience relatively high-temperatures, the sealing assembly may include a support adapted to endure relatively low-temperatures, an engine component adapted to endure relatively high-temperatures and spaced from the support to create a gap, and a seal arranged between the support and the engine component to block gasses from passing through the gap and to insulate the support from the relatively high-temperature engine component.

For the purposes of promoting an understanding of the principles of the disclosure, reference will now be made to a number of illustrative embodiments illustrated in the drawings and specific language will be used to describe the same.

Figure 2:
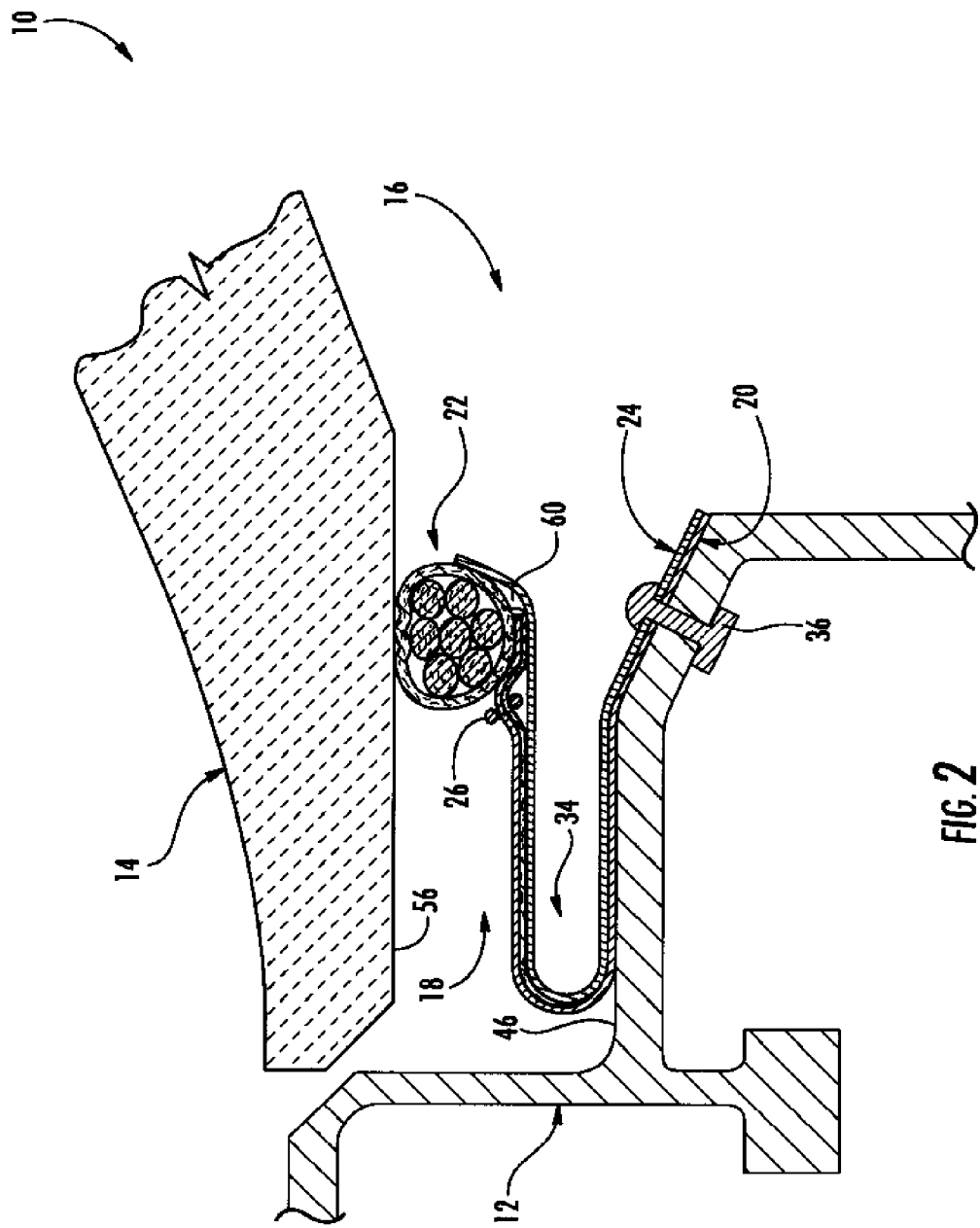
FIG. 2 is an enlarged cross-sectional elevation view of a first embodiment of a seal arranged to be used in the sealing assembly of FIG. 1, the sealing assembly may include the support, the engine component may be spaced from the support, and the first embodiment of a seal may be arranged between the support and the engine component to block gasses from passing through the gap and to insulate the support from the relatively high-temperature engine component.

A sealing assembly 10 that may be adapted for use in an exhaust nozzle 120 of a gas turbine engine 110 is shown in FIG. 1. The sealing assembly 10 may include a support 12, an engine component 14, and a seal 16 as shown in FIG. 2. The gas turbine engine 110 may include an inlet 112, a compressor 114, a combustor 116, a turbine 118, and the exhaust nozzle 120 as shown in FIG. 1. The compressor 114 may receive and compress air from the inlet 112. The compressed air may be, in turn, delivered to the combustor 116. The combustor 116 may be configured to mix fuel with the compressed air and to ignite the fuel. The hot, high-pressure products of the combustion reaction in the combustor 116 may be directed into the turbine 118 which drives the compressor 114 and then out through the exhaust nozzle 120 to propel the gas turbine engine 110 forward.

The support 12 may be made from a metallic material adapted for use in relatively low-temperature conditions spaced apart from the gas path of the exhaust nozzle 120 as shown in FIG. 2. The engine component 14 may be made from a composite material adapted to withstand high-temperatures and faces the gas path of the exhaust nozzle 120. During operation, the engine component 14 may be heated to relatively high-temperatures as it is exposed to high-temperature gasses passing through the exhaust nozzle 120 to drive the gas turbine engine 110.

The support 12 may include a support-seal surface 46 and the engine component 14 may include a component-seal surface 56 as shown, for example, in FIG. 2. The engine component 14 may be mounted relative to the support 12 to define a gap 18 between the component-seal surface 56 and the support-seal surface 46. The support-seal surface 46 and the component-seal surface 56 may be substantially smooth, continuous surfaces. The seal 16 may be arranged between the support 12 and the engine component 14 to block gasses from passing through the gap 18. The gap 18 may allow for variations in manufacturing tolerance of the adjacent components 12, 14 and allow for expansion/contraction of the adjacent components 12, 14 that may occur during operation of the gas turbine engine 110 on account of temperature gradients throughout the engine 110.

The seal 16 may be adapted to compress and expand to fill the gap 18 during expansion and contraction of the adjacent components 12, 14 that may occur during operation of the gas turbine engine 110 including the sealing assembly 10 as suggested, for example, in FIG. 2. The seal 16 may include a mount ring 20, a ceramic tadpole gasket 22, and a retainer ring 24 as shown, for example, in FIG. 2. The mount ring 20 and retainer ring 24 may be made from metallic materials and may be configured to push the ceramic tadpole gasket 22 toward engagement with the engine component 14. The ceramic tadpole gasket 22 may engage the engine component 14 and may insulate the mount ring 20 and the retainer ring 24 from the high-temperatures of the engine component 14. The retainer ring 24 may couple to the mount ring 20 and hold the ceramic tadpole gasket 22 in place relative to the mount ring 20.

Figure 3:
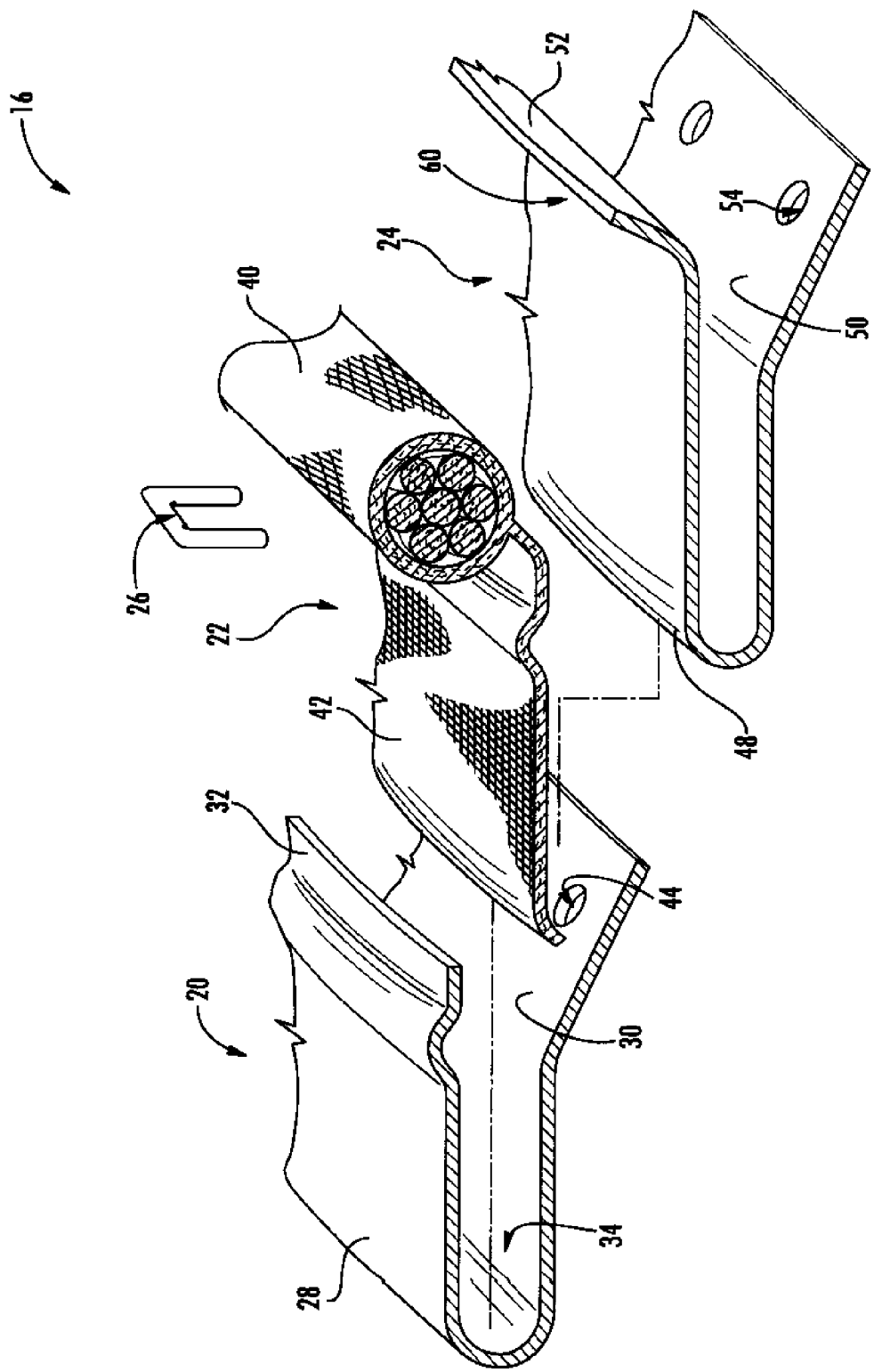
FIG. 3 is an exploded perspective view of a portion of the first embodiment of the seal adapted to be used in the sealing assembly of FIG. 2 showing that the seal may include a mount ring formed to include a retainer channel, a ceramic tadpole gasket adapted to extend into the retainer channel, a retainer ring adapted to be received in the retainer channel of the mount ring to trap the ceramic tadpole gasket in the retainer channel, and a staple adapted to extend through the mount ring and the ceramic tadpole gasket to couple the ceramic tadpole gasket to the mount ring.
Figure 4:
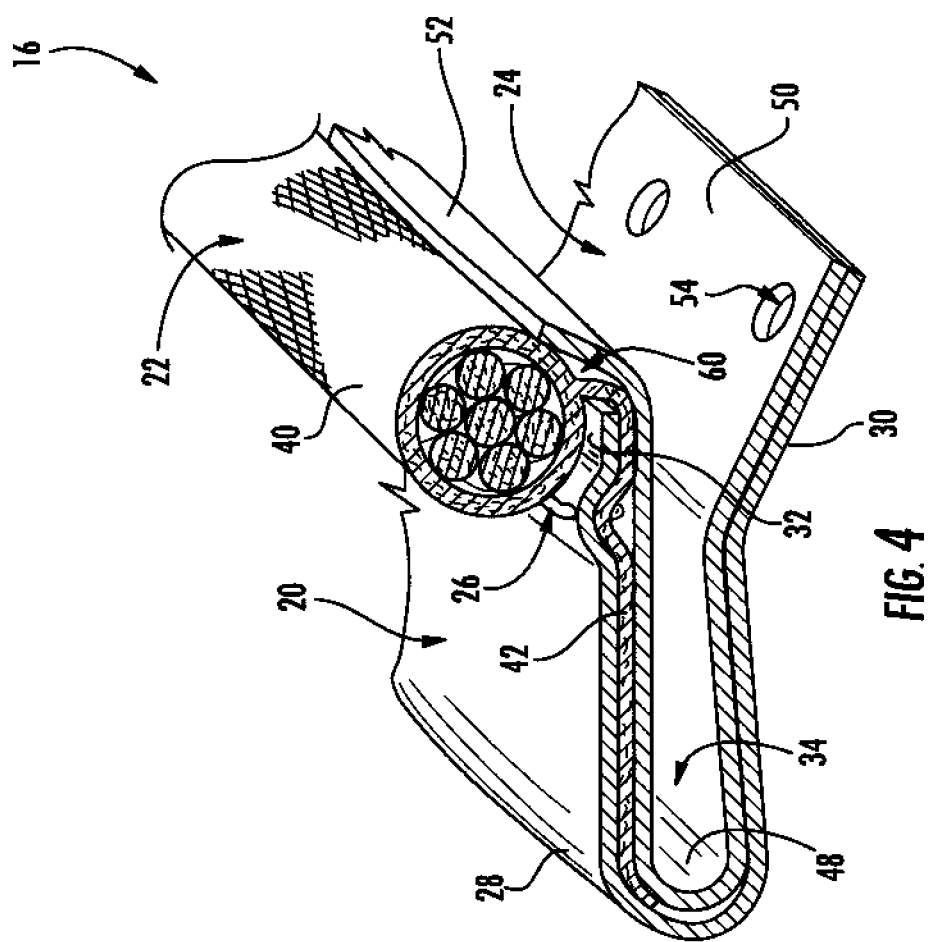
FIG. 4 is a perspective assembly view of a portion of the first embodiment of the seal of FIG. 2 showing that the seal may include the mount ring formed to include the retainer channel, the ceramic tadpole gasket extending into the retainer channel, the retainer ring received in the retainer channel of the mount ring to trap the ceramic tadpole gasket in the retainer channel, and the staple extending through the mount ring and the ceramic tadpole gasket to couple the ceramic tadpole gasket to the mount ring.

Turning particularly to the first illustrative embodiment of the sealing assembly 10 shown in FIGS. 1-4, the support 12, the engine component 14, and the seal 16 may be annular as suggested in FIGS. 3 and 4. As shown in FIG. 2, the engine component 14 may be spaced apart from the support 12 radially to form a gap 18. The seal 16 may be arranged between the support 12 and the engine component 14 such that the seal 16 contacts the outer radial support-seal surface 46 of the support 12 and engages the inner radial component-seal surface 56 of the engine component 14.

The seal 16 may block movement of gasses through the gap 18 and may include the mount ring 20, the ceramic tadpole gasket 22, the retainer ring 24, and a number of staples 26 as shown in FIGS. 2-4. The mount ring 20 may cooperate with the ceramic tadpole gasket 22 to block gasses from passing through the gap 18 as shown in FIG. 2. The ceramic tadpole gasket 22 may also insulate the mount ring 20, the retainer ring 24, the staples 26, and the support 12 from the high-temperatures of the engine component 14. The retainer ring 24 may cooperate with the mount ring 20 to trap the ceramic tadpole gasket 22 between the mount ring 20 and the retainer ring 24 to block the ceramic tadpole gasket 22 from moving away from the mount ring 20. The staples 26 may couple the ceramic tadpole gasket 22 to the mount ring 20 to further block the ceramic tadpole gasket 22 from moving away from the mount ring 20.

The mount ring 20 may push the ceramic tadpole gasket 22 into engagement with the engine component 14 as suggested in FIG. 2. The mount ring 20 may be made from a metallic material. The mount ring 20 may lose structural integrity at the relatively high-temperatures experienced by the engine component 14. As such, the ceramic tadpole gasket 22 may be positioned between the mount ring 20 and the engine component 14 to insulate the mount ring 20 from the relatively-high temperatures of the engine component 14. The size, shape, and material of the mount ring 20 may be chosen in cooperation with the size, shape, and material of the ceramic tadpole gasket 22 such that the mount ring 20 pushes the ceramic tadpole gasket 22 toward engagement with the engine component 14 during operation of the gas turbine engine 110.

The mount ring 20 may be a monolithic component and may include a spring portion 28, a coupler portion 30, and a curved pusher portion 32 as shown in FIG. 3. The spring portion 28 may push the ceramic tadpole gasket 22 toward engagement with the engine component 14. The coupler portion 30 may extend from a first end of the spring portion 28 and couple the seal 16 to the support 12. The curved pusher portion 32 may extend from a second end of the spring portion 28 and engage the ceramic tadpole gasket 22 to trap the ceramic tadpole gasket 22 between the mount ring 20 and the engine component 14.

The spring portion 28 may be formed to have a U-shaped cross-section that forms a retention channel 34 as shown in FIGS. 2 and 3. The spring portion 28, has legs that extend generally parallel to the component seal surface of the engine component and a bottom spaced apart from the compressible head of the ceramic tadpole gasket that interconnects the legs as shown in FIG. 2. The spring portion 28 may be configured to push the ceramic tadpole gasket 22 away from the support 12 and toward the engine component 14. The retention channel 34 may be sized to receive a portion of the ceramic tadpole gasket 22 and the retainer ring 24 when the retainer ring 24 is inserted into the retention channel 34 along with a portion of the ceramic tadpole gasket 22. The ceramic tadpole gasket 22 may be trapped in the retention channel 34 to block the ceramic tadpole gasket 22 from moving relative to the mount ring 20.

The coupler portion 30 may couple the seal 16 to the support 12 as shown in FIG. 2. The coupler portion 30 may be coupled to the support 12 by fasteners that extend through the coupler portion 30 and into the support 12. The coupler portion 30 may be shaped to match the contour of the outer radial support-seal surface 46 of the support 12. The coupler portion 30 may be formed to include a number of circumferentially spaced through holes 44 sized to receive rivets 36 that extend through the through holes 44 and the support 12 to couple the seal 16 to the support 12. In other embodiments, the seal 16 may be fastened to the support 12 by other means or fasteners.

The curved pusher portion 32 included in the mount ring 20 may engage a portion of the ceramic tadpole gasket 22 to position the ceramic tadpole gasket 22 between the mount ring 20 and the engine component 14 as shown in FIGS. 2-4. The curved pusher portion 32 may extend around a portion of the ceramic tadpole gasket 22 to support the ceramic tadpole gasket 22.

The ceramic tadpole gasket 22 may include a compressible head 40 and a flat body 42 extending from the compressible head 40 as shown in FIGS. 2-4. The compressible head 40 may be pushed by the mount ring 20 and the retainer ring 24 toward the engine component 14 to engage the engine component 14. The flat body 42 may extend from the compressible head 40 into the retention channel 34 and may be trapped in the retention channel 34 to block the compressible head 40 from moving away from the mount ring 20 and, thus, the engine component 14.

The compressible head 40 may be shaped, sized, and made from a material such that the compressible head 40 may engage the engine component and deform to match the contour of the engine component 14 as suggested in FIG. 2. By engaging the engine component 14 along the gap 18, the compressible head 40 may block gasses from passing through the gap 18 between the support 12 and the engine component 14 and may insulate the mount ring 20, the retainer ring 24, and the support 12 from the heat of the engine component 14.

The flat body 42 may extend from the compressible head 40 and may be formed to have a relatively low profile relative to the compressible head 40 as shown in FIG. 3. The flat body 42 may extend into the retention channel 34 formed in the mount ring 20 and may be trapped in the retention channel 34 between the mount ring 20 and the retainer ring 24. The flat body 42 may be flexible and conform to the contour of the mount ring 20. The flat body 42 may be trapped in the retention channel 34 such that the flat body 42 and, thus, the compressible head 40 may be blocked from moving relative to the mount ring 20.

The retainer ring 24 included in the seal 16 may cooperate with the mount ring 20 to trap the flat body 42 of the ceramic tadpole gasket 22 in the retention channel 34 as shown in FIG. 2. By trapping the flat body 42 between the mount ring 20 and the retainer ring 24, the retainer ring 24 may block the ceramic tadpole gasket 22 from moving away from the mount ring 20. The retainer ring 24 may cooperate with the mount ring 20 and the ceramic tadpole gasket 22 to block gasses from passing through the gap 18 between the support 12 and the engine component 14. The retainer ring 24 may be made from a metallic material and may lose structural integrity at the relatively-high-temperatures experienced by the engine component 14. As such, the ceramic tadpole gasket 22 may be positioned between the retainer ring 24 and the engine component 14 to insulate the retainer ring 24 from the relatively-high-temperatures of the engine component 14.

The retainer ring 24 may be a monolithic component and may include a spring portion 48, a coupler portion 50 coupled to a first end of the spring portion 48, and a keeper portion 52 coupled to a second end of the spring portion 48 as shown in FIG. 3. The spring portion 48 may push the ceramic tadpole gasket 22 toward the engine component 14 as shown in FIG. 2. The coupler portion 50 may couple the seal 16 to the support 12. The keeper portion 52 may engage the compressible head 40 of the ceramic tadpole gasket 22 to hold the compressible head 40 in place relative to the curved pusher portion 32 of the mount ring 20 as shown in FIGS. 2-4.

The spring portion 48 of the retainer ring 24 may be formed to have a U-shaped cross-section and may be nested in the retention channel 34 formed by the mount ring 20 as shown in FIGS. 2-4. The spring portion 48 may be configured to push the ceramic tadpole gasket 22 away from the support 12 and into contact with the engine component 14. The spring portion 48 may be further sized to be received in the retention channel 34 such that the ceramic tadpole gasket 22 may be trapped in the retention channel 34 between the mount ring 20 and the retainer ring 24 to block the ceramic tadpole gasket 22 from moving relative to the mount ring 20.

The coupler portion 50 may couple the seal 16 to the support 12. The coupler portion 50 may overlap the coupler portion 30 of the mount ring 20. The coupler portion 50 may be coupled to the coupler portion 30 of the mount ring 20 by fasteners 36 that extend through the coupler portion 50 and into the support 12. The coupler portion 50 may be shaped to match the contour of the coupler portion 30 of the mount ring 20 and the support 12. The coupler portion 50 may be formed to include a number of circumferentially spaced through holes 54 sized to receive rivets 36. The rivets 36 may extend through the through holes 54 in the retainer ring 24 and the mount ring 20, and the support 12 to couple the seal 16 to the support 12. In other embodiments, the seal 16 may be fastened to the support 12 by other means or fasteners.

The keeper portion 52 included in the retainer ring 24 may engage the compressible head 40 of the ceramic tadpole gasket 22 to hold the compressible head 40 in place relative to the curved pusher portion 32 of the mount ring 20 as shown in FIGS. 2-4. The keeper portion 52 may extend from the second end of the spring portion 48 of the retainer ring 24 and blocks the compressible head 40 from moving away from the curved pusher portion 32. The curved pusher portion 32 of the mount ring 20 and the keeper portion 52 of the retainer ring 24 may cooperate to define an annular gasket channel 60 as shown in FIGS. 2-4. The annular gasket channel 60 may open radially outward toward the engine component 14 and may be sized to receive a portion of the compressible head 40.

The staples 26 included in the seal 16 may couple the ceramic tadpole gasket 22 to the mount ring 20 to further block the ceramic tadpole gasket 22 from moving away from the mount ring 20. The staples 26 may extend through the curved pusher portion 32 of the mount ring 20 and the flat body 42 of the ceramic tadpole gasket 22. The staples 26 may be deformed inwardly to couple the flat body 42 to the curved pusher portion 32. In other embodiments, the staples 26 may be deformed outwardly.

The size, shape, and materials of the seal 16 may be chosen such that the seal 16 blocks gases from passing through the gap 18 and insulates the support 12 from the high-temperatures of the engine component 14 during operation of the gas turbine engine 110 as shown in FIG. 2. Factors considered may include, for example, coefficients of thermal expansion, spring constants, mechanical deformation properties, and the machine tolerances of the support 12, the engine component 14, and components of the seal 16.

A method of assembling the seal 16 may include positioning the flat body 42 into the retention channel 34 formed by the mount ring 20 and inserting the retainer ring 24 into the retention channel 34 as shown in FIG. 4. The retainer ring 24 may trap the flat body 42 in the retention channel 34 so that the ceramic tadpole gasket is coupled to the mount ring 20 and the compressible head 40 of the ceramic tadpole gasket 22 is held in position relative to the mount ring 20. In some embodiments, the method may include fastening the flat body 42 to the mount ring 20 with the staples 26.

In some embodiments, the mount ring 20 may include the spring portion 28 having a U-shaped cross-section that forms the retention channel 34. The flat body 42 may extend along the spring portion 28 of the mount ring 20.

Figure 5:
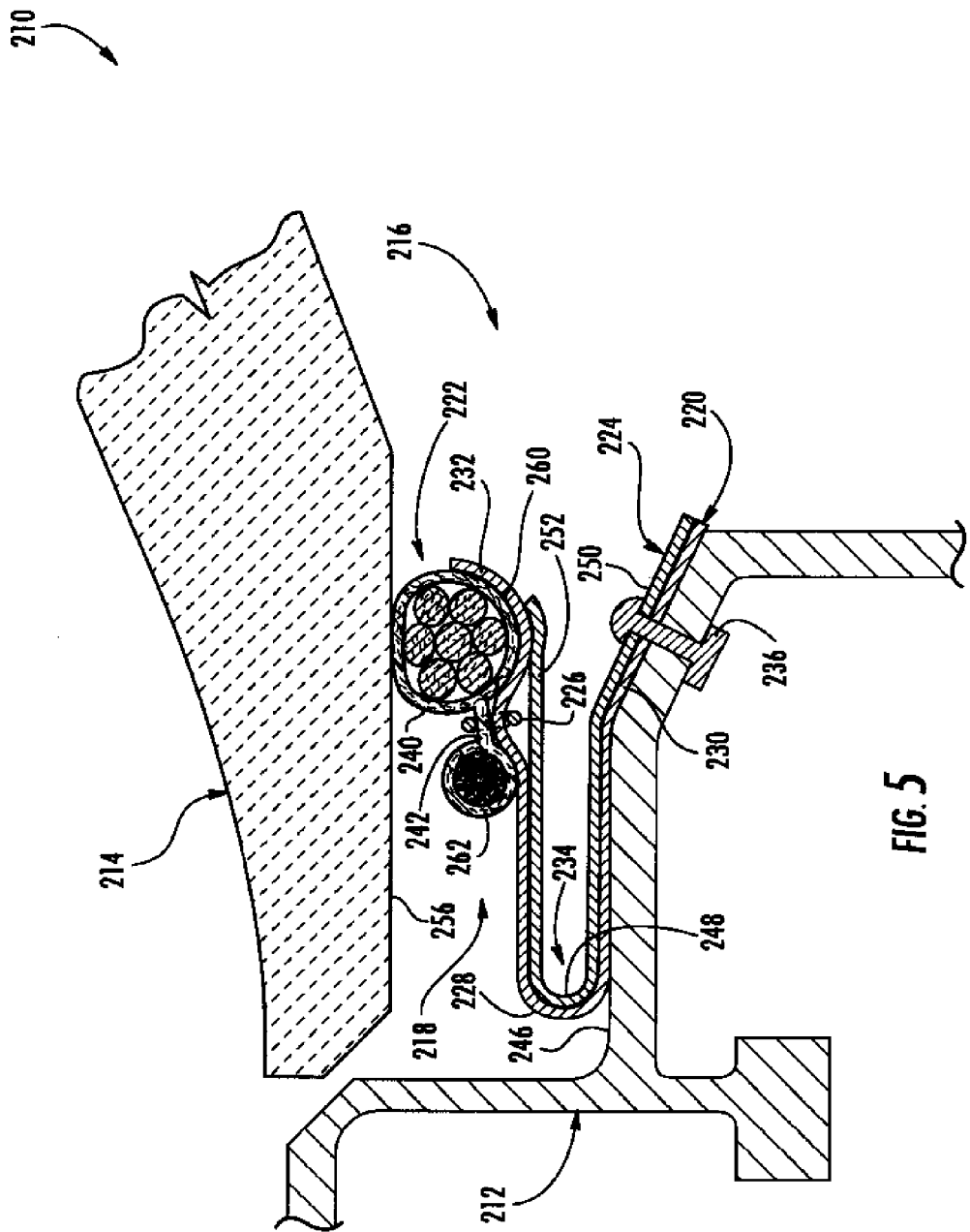
FIG. 5 is an enlarged cross-sectional elevation view of a second embodiment of a seal adapted to be used in the sealing assembly of FIG. 1, the sealing assembly may include a support, an engine component spaced from the support, and the second embodiment of a seal may be arranged between the support and the engine component to block gasses from passing through the gap and to insulate the support from the relatively high-temperature engine component.
Figure 6:
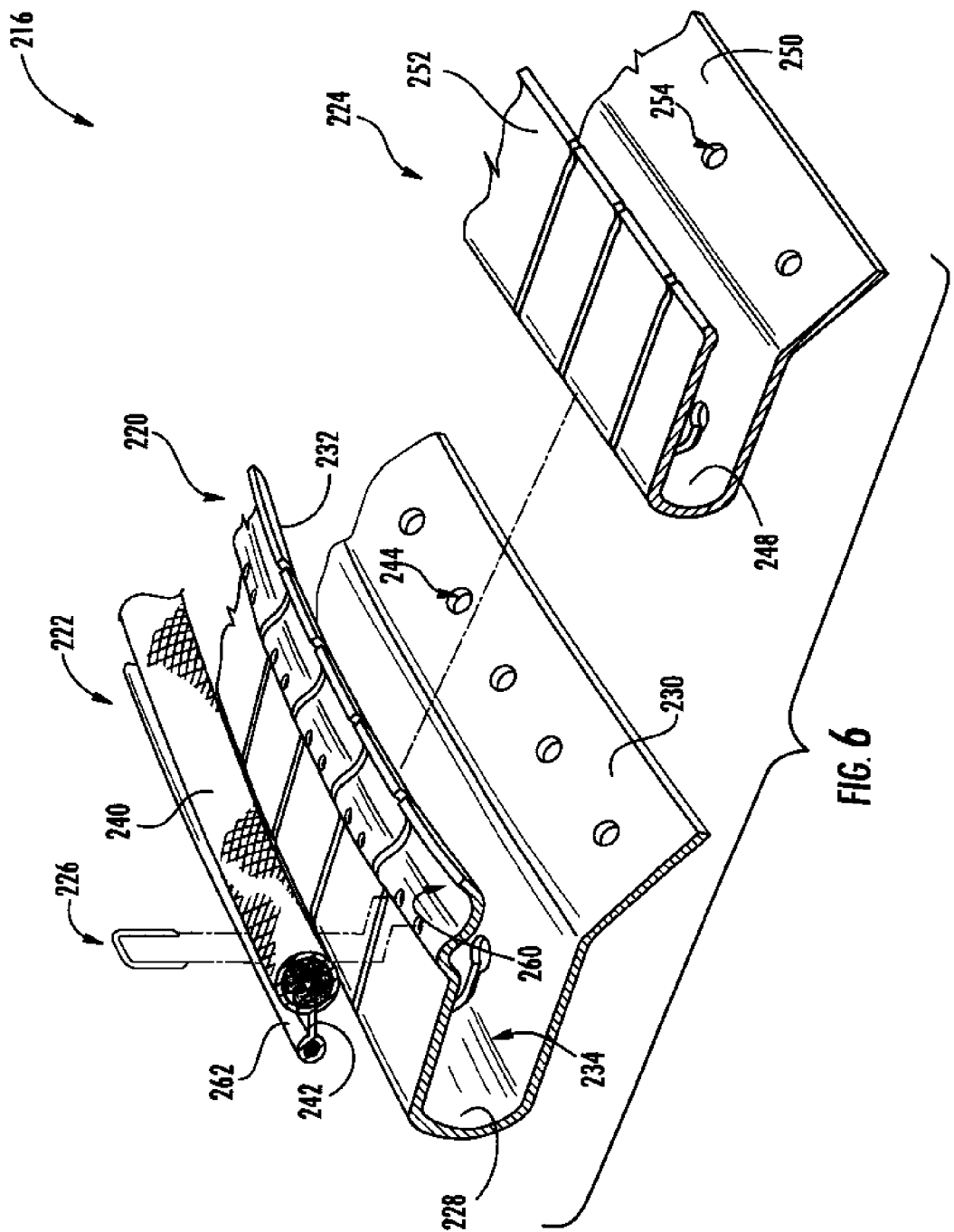
FIG. 6 is an exploded perspective view of a portion of the second embodiment of the seal adapted to be used in a sealing assembly of FIG. 5 showing that the seal may include a mount ring formed to include a retainer channel, a ceramic tadpole gasket, a retainer ring adapted to be received in the retainer channel of the mount ring, and a staple adapted to extend through the mount ring and the ceramic tadpole gasket to couple the ceramic tadpole gasket to the mount ring.
Figure 7:
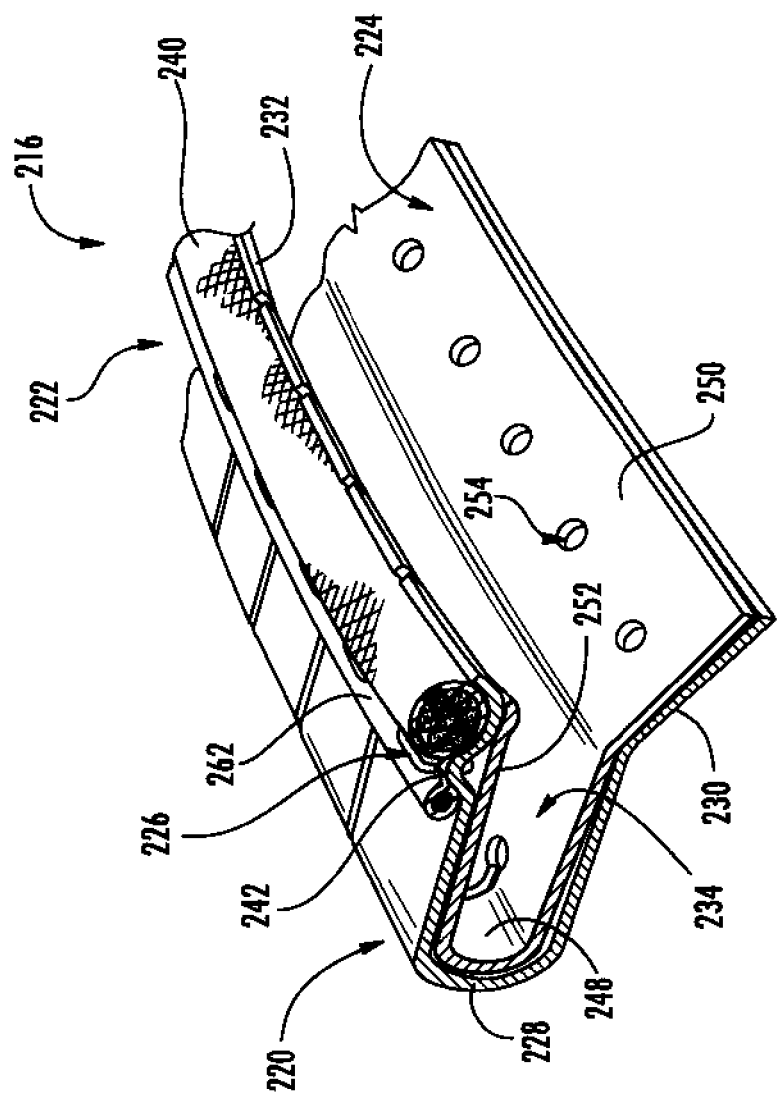
FIG. 7 is a perspective assembly view of a portion of the seal of FIG. 5 showing that the second embodiment of the seal may include the mount ring, the ceramic tadpole gasket, the retainer ring received by the mount ring, and the staple extending through the mount ring and the ceramic tadpole gasket to couple the ceramic tadpole gasket to the mount ring.

A second illustrative seal 216 incorporated into a second sealing assembly 210 is shown in FIGS. 5-7. The seal 216 and sealing assembly 210 are substantially similar to the seal 16 and sealing assembly 10 shown in FIGS. 1-4 and described herein. Accordingly, similar reference numbers in the 200 series indicate features that are common between the seal 16 and the seal 216 as well as between the sealing assembly 10 and the sealing assembly 210. The description of the seal 16 and sealing assembly 10 are hereby incorporated by reference to apply to the seal 216 and sealing assembly 210, except in instances when it conflicts with the specific description and drawings of the seal 216 and sealing assembly 210.

In the second illustrative embodiment, the sealing assembly 210 may include an engine component 214, a support 212, and the seal 216 as shown in FIGS. 5-7. The engine component 214 may be spaced apart from the support 212 radially to form a gap 218 as shown in FIG. 5. The seal 216 may be arranged between the support 212 and the engine component 214 such that the seal 216 contacts an outer radial support-seal surface 246 of the support 212 and engages an inner radial component-seal surface 256 of the engine component 214.

The seal 216 may block movement of gasses through the gap 218 and may include a mount ring 220, a ceramic tadpole gasket 222, a retainer ring 224, and a number of staples 226 as shown in FIGS. 5-7. As suggested in FIGS. 6 and 7, the ceramic tadpole gasket 222 may be supported by the mount ring 220, the staples 226 couple the ceramic tadpole gasket 222 to the mount ring 220, and the retainer ring 224 is received by the mount ring 220.

The mount ring 220 may push the ceramic tadpole gasket 222 into engagement with the engine component 214 as shown in FIG. 5. The mount ring 220 may include a spring portion 228, a coupler portion 230, and a curved pusher portion 232 as shown in FIG. 6.

The curved pusher portion 232 may engage a greater portion of the compressible head 240 relative to the curved pusher portion 32 of the first embodiment of the seal 16 as shown in FIG. 5. As such, the curved pusher portion 232 alone may define an annular gasket channel 260 that blocks a compressible head 240 of the ceramic tadpole gasket 222 from moving away from the curved pusher portion 232. The annular gasket channel 260 may open radially outward toward the engine component 214.

The ceramic tadpole gasket 222 may include a compressible head 240, a flat body 242, and a retention tail 262 as shown in FIGS. 5-7. The compressible head 240, the flat body 242, and the retention tail 262 may be supported by the curved pusher portion 232.

The flat body 242 of the ceramic tadpole gasket 222 may extend from the compressible head 240 and may be formed to have a relatively low profile relative to the compressible head 240 as shown in FIG. 6. The flat body 242 may extend over the curved pusher portion 232 and may be retained in place relative to the curved pusher portion 232 by the staples 226. The flat body 242 may be flexible and may conform to the contour of the curved pusher portion 232. The flat body 242 may be trapped by the staples 226 such that the flat body 242 and, thus, the compressible head 240 and retention tail 262 may be blocked from moving relative to the mount ring 220.

The retention tail 262 may be coupled to the flat body 242 opposite the compressible head 240 as shown in FIG. 6. The retention tail 262 may have a profile smaller than the compressible head 240 and larger than the flat body 242. The retention tail 262 may locate the staples 26 between the retention tail 262 and the compressible head 240.

The retainer ring 224 included in the seal 216 may cooperate with the mount ring 220 to push the ceramic tadpole gasket 222 into engagement with the engine component 214 as shown in FIG. 5. The retainer ring 224 may include a spring portion 248, a coupler portion 250, and a keeper portion 252 as shown in FIG. 6.

The keeper portion 252 may extend from the spring portion 248 of the retainer ring 224 as shown in FIG. 6. The keeper portion 252 and the curved pusher portion 232 may cooperate to trap the staples 226 between the curved pusher portion 232 and the keeper portion 252. The keeper portion 252 may engage the curved pusher portion 232 to hold the compressible head 240 in place relative to the engine component 214 as shown in FIGS. 5-7.

The staples 226 included in the seal 216 may couple the ceramic tadpole gasket 222 to the mount ring 220 to block the ceramic tadpole gasket 222 from moving away from the mount ring 220 as shown in FIG. 7. The staples 226 may extend through the flat body 242 of the ceramic tadpole gasket 222 and the curved pusher portion 232 of the mount ring 220. The staples 226 may be deformed inwardly to couple the flat body 242 to the curved pusher portion 232. In other embodiments, the staples 226 may be deformed outwardly.

Another illustrative seal 316 adapted for use in sealing assembly 210 in place of seal 216 is shown in FIG. 8. The seal 316 is substantially similar to the seal 216 shown in FIGS. 5-7 and described herein. Accordingly, similar reference numbers in the 300 series indicate features that are common between the seal 216 and the seal 316. The description of the seal 216 is hereby incorporated by reference to apply to the seal 316, except in instances when it conflicts with the specific description and drawings of the seal 216.

The seal 316 may be adapted to block movement of gasses through the gap 218 and may include a mount ring 320, a ceramic tadpole gasket 322, a retainer ring 324, insulative paper 364, and a number of staples 326 as shown in FIG. 8. As suggested in FIG. 8, the ceramic tadpole gasket 322 may be supported by the mount ring 320 and the retainer ring 324, the staples 326 may couple the ceramic tadpole gasket 322 to the mount ring 320, and the retainer ring 324 may be received by the mount ring 320 to trap the insulative paper 364 between the mount ring 320 and the retainer ring 324.

The mount ring 320 may include a spring portion 328, a coupler portion 330, and a curved pusher portion 332 as shown in FIG. 8. The spring portion 328 may be formed to have a U-shaped cross-section that forms a retention channel 334. The retention channel 334 may be sized to receive the insulative paper 364 and the retainer ring 324. The curved pusher portion 332 may be adapted to engage a portion of the ceramic tadpole gasket 322 to position the ceramic tadpole gasket 322 between the mount ring 320 and the engine component 214. The curved pusher portion 332 may extend around a portion of the ceramic tadpole gasket 322 to support the ceramic tadpole gasket 322.

The insulative paper 364 may be trapped in the retention channel 334 between the mount ring 320 and the retainer ring 324 as shown in FIG. 8. The insulative paper 364 may be adapted to insulate the retainer ring 324 and the coupler portion 330 of the mount ring 320 from the relatively-high-temperatures of the engine component 214. The insulative paper 364 may be made from ceramic materials.

The retainer ring 324 may include a spring portion 348, a coupler portion 350, and a keeper portion 352 as shown in FIG. 8. The spring portion 348 of the retainer ring 324 may be formed to have a U-shaped cross-section and may be nested in the retention channel 334 formed by the mount ring 320 as shown in FIG. 8. The spring portion 348 may be further sized to be received in the retention channel 334 such that the insulative paper 364 may be trapped in the retention channel 334 between the mount ring 320 and the retainer ring 324.

The keeper portion 352 may extend from the spring portion 348 of the retainer ring 324 and may block a compressible head 340 of the ceramic tadpole gasket 322 from moving away from the curved pusher portion 332 as shown in FIG. 8. The curved pusher portion 332 of the mount ring 320 and the keeper portion 352 of the retainer ring 324 may cooperate to define an annular gasket channel 360. The annular gasket channel 360 may be adapted to open radially outward toward the engine component 214 and may be sized to receive a portion of the compressible head 340.

Another illustrative seal 416 adapted for use in the sealing assembly 210 in place of the seal 216 is shown in FIG. 9. The seal 416 is substantially similar to the seal 216 shown in FIGS. 5-7 and described herein. Accordingly, similar reference numbers in the 400 series indicate features that are common between the seal 216 and the seal 416. The description of the seal 216 is hereby incorporated by reference to apply to the seal 416, except in instances when it conflicts with the specific description and drawings of the seal 216.

The seal 416 may be adapted to block movement of gasses through the gap 218 and may include a mount ring 420, a ceramic tadpole gasket 422, a retainer ring 424, and a number of staples 426 as shown in FIG. 9. The ceramic tadpole gasket 422 may be supported by the mount ring 420 and the retainer ring 424, the retainer ring 424 may be received by the mount ring 420 and may be coupled to the mount ring 420, and the staples 426 may couple the ceramic tadpole gasket 422 to the retainer ring 424.

The mount ring 420 may include a spring portion 428, a coupler portion 430, and a curved pusher portion 432 as shown in FIG. 9. The curved pusher portion 432 may be adapted to engage a portion of the ceramic tadpole gasket 422 to position the ceramic tadpole gasket 422 between the mount ring 420 and the engine component 214. The curved pusher portion 432 may be formed to include a number of mount slots 466 sized to receive a number of retainer-ring arms 468 as shown in FIG. 9. The number of mount slots 466 may be spaced apart circumferentially about the curved pusher portion 432.

The retainer ring 424 may include a spring portion 448, a coupler portion 450, and a keeper portion 452 as shown in FIG. 9. The keeper portion 452 may extend from the spring portion 448 of the retainer ring 424 and may block a compressible head 440 of the ceramic tadpole gasket 422 from moving away from the curved pusher portion 432. The curved pusher portion 432 and the keeper portion 452 may cooperate to define an annular gasket channel 460. The annular gasket channel 460 may be adapted to open radially outward toward the engine component 214 and may be sized to receive the ceramic tadpole gasket 422.

The keeper portion 452 may be formed to include the number of retainer-ring arms 468 as shown in FIG. 9. The number of retainer-ring arms 468 may be spaced apart circumferentially about the keeper portion 452 and may align with the number of mount slots 466. The number of retainer-ring arms 468 may be sized to be received by the number of mount slots 466. Each retainer-ring arm 468 may extend through a mount slot 466 and may be folded over the curved pusher portion 432 to couple the retainer ring 424 to the mount ring 420.

The ceramic tadpole gasket 422 may have a relatively-low coefficient of thermal conductivity and may include a compressible head 440, a flat body 442, and a retention tail 462 as shown in FIG. 9. The ceramic tadpole gasket 422 may be positioned in the annular gasket channel 460 and a portion of the compressible head 440 may extend outwardly beyond the annular gasket channel 460 and may be adapted to engage the engine component 214.

The staples 426 may couple the ceramic tadpole gasket 422 to the retainer ring 424 to block the ceramic tadpole gasket 422 from moving away from the retainer ring 424 as shown in FIG. 9. The staples 426 may extend through the flat body 442 of the ceramic tadpole gasket 422 and the keeper portion 452. The staples 426 may be deformed inwardly to couple the flat body 442 to the keeper portion 452. In other embodiments, the staples 426 may be deformed outwardly.

Another illustrative seal 516 adapted for use in the sealing assembly 210 in place of the seal 216 is shown in FIG. 10. The seal 516 is substantially similar to the seal 216 shown in FIGS. 5-7 and described herein. Accordingly, similar reference numbers in the 500 series indicate features that are common between the seal 216 and the seal 516. The description of the seal 216 is hereby incorporated by reference to apply to the seal 516, except in instances when it conflicts with the specific description and drawings of the seal 216.

The seal 516 may be adapted to block movement of gasses through the gap 218 and may include a mount ring 520, a ceramic tadpole gasket 522, and a retainer ring 524 as shown in FIG. 10. As suggested in FIG. 10, the ceramic tadpole gasket 522 may be supported by the mount ring 520 and the retainer ring 524 and the retainer ring 524 may be received by the mount ring 520 to trap the ceramic tadpole gasket 522 between the mount ring 520 and the retainer ring 524.

The mount ring 520 may include a spring portion 528, a coupler portion 530, and a curved pusher portion 532 as shown in FIG. 10. The spring portion 528 may be formed to have a U-shaped cross-section that forms a retention channel 534 as shown in FIG. 10. The retention channel 534 may be sized to receive a portion of the ceramic tadpole gasket 522 and the retainer ring 524. The curved pusher portion 532 may be adapted to engage a portion of the ceramic tadpole gasket 522 to position the ceramic tadpole gasket 522 between the mount ring 520 and the engine component 214. The curved pusher portion 532 may extend around a portion of the ceramic tadpole gasket 522 to support the ceramic tadpole gasket 522.

The ceramic tadpole gasket 522 may include a compressible head 540, a flat body 542, and a retention tail 562 as shown in FIG. 10. The flat body 542 and the retention tail 562 may extend into the retention channel 534 formed in the mount ring 520 and may be trapped in the retention channel 534 between the mount ring 520 and the retainer ring 524. The flat body 542 may be flexible and may conform to the contour of the mount ring 520. The flat body 542 and the retention tail 562 may be trapped in the retention channel 534 such that the flat body 542 and retention tail 562 and, thus, the compressible head 540 may be blocked from moving relative to the mount ring 520.

The retainer ring 524 may include a spring portion 548, a coupler portion 550, and a keeper portion 552 as shown in FIG. 10. The spring portion 548 of the retainer ring 524 may be formed to have a U-shaped cross-section and may be nested in the retention channel 534 formed by the mount ring 520. The spring portion 548 may be further sized to be received in the retention channel 534 such that the flat body 542 and retention tail 562 may be trapped in the retention channel 534 between the mount ring 520 and the retainer ring 524. The keeper portion 552 may extend from the spring portion 548 of the retainer ring 524 and may block the compressible head 540 of the ceramic tadpole gasket 522 from moving away from the curved pusher portion 532. The curved pusher portion 532 of the mount ring 520 and the keeper portion 552 of the retainer ring 524 may cooperate to define an annular gasket channel 560. The annular gasket channel 560 may be adapted to open radially outward toward the engine component 214 and may be sized to receive a portion of the compressible head 540.

A sixth illustrative seal 616 incorporated into a sixth sealing assembly 610 is shown in FIGS. 11-15. The seal 616 and sealing assembly 610 are substantially similar to the seal 16 and sealing assembly 10 shown in FIGS. 1-4 and described herein. Accordingly, similar reference numbers in the 600 series indicate features that are common between the seal 16 and the seal 616 as well as between the sealing assembly 10 and the sealing assembly 610. The description of the seal 16 and sealing assembly 10 are hereby incorporated by reference to apply to the seal 616 and sealing assembly 610, except in instances when it conflicts with the specific description and drawings of the seal 616 and sealing assembly 610.

Figure 11:
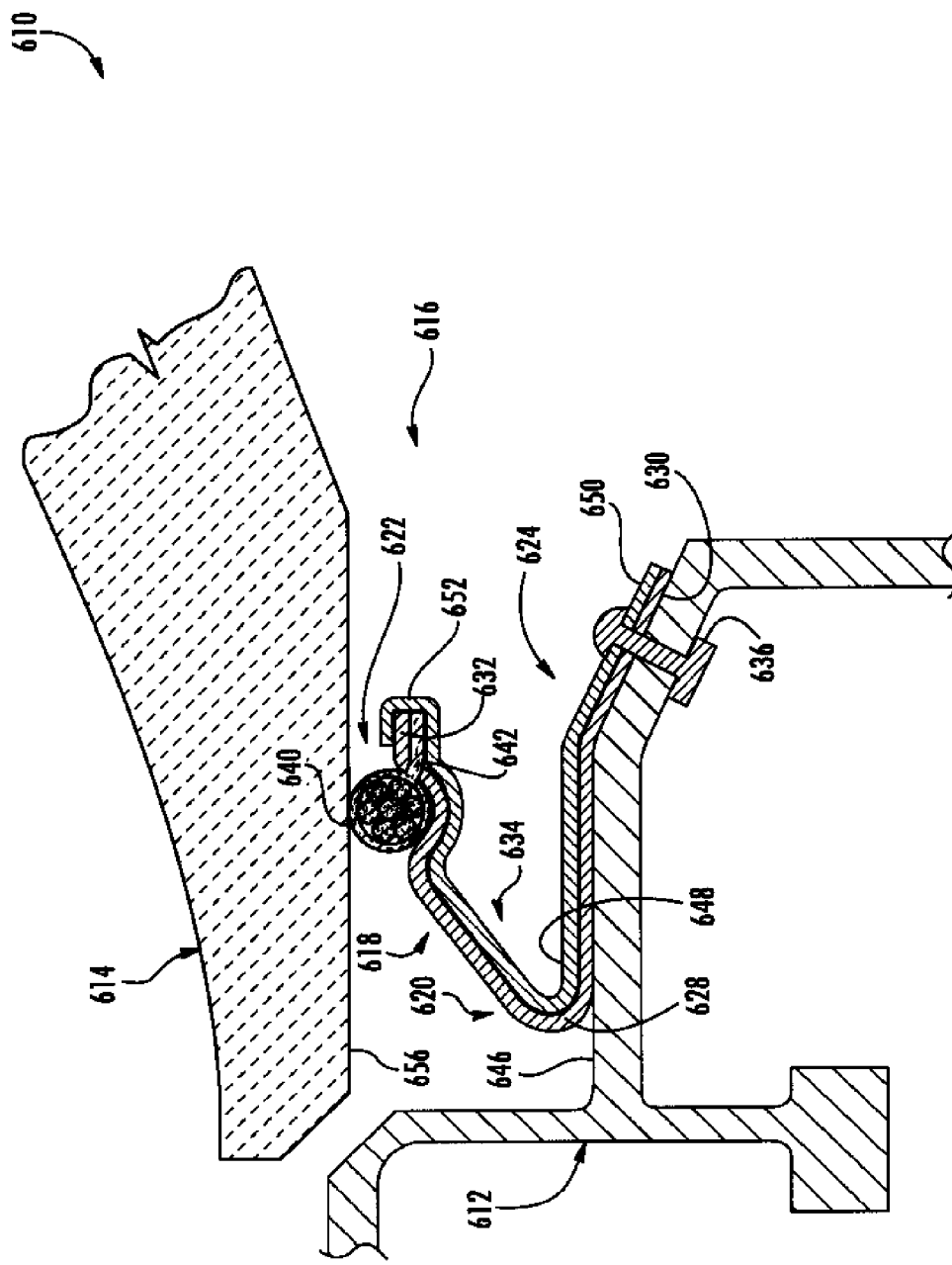
FIG. 11 is an enlarged cross-sectional view of a sixth embodiment of a seal adapted to be used in the sealing assembly of FIG. 1, the seal may include a mount ring formed to include a retainer channel, a ceramic tadpole gasket extending along the mount ring, and a retainer ring received in the retainer channel of the mount ring to trap the ceramic tadpole gasket between the mount ring and retainer ring, a portion of the retainer ring may be folded over the mount ring and the ceramic tadpole gasket to block the ceramic tadpole gasket from moving relative to the mount ring.

In the sixth illustrative embodiment, the sealing assembly 610 may include an engine component 614, a support 612, and the seal 616 as shown in FIG. 11. The engine component 614 may be spaced apart from the support 612 radially to form a gap 618. The seal 616 may be arranged between the support 612 and the engine component 614 such that the seal 616 contacts an outer radial support-seal surface 646 of the support 612 and engages an inner radial component-seal surface 656 of the engine component 614.

The seal 616 may block movement of gasses through the gap 618 and may include a mount ring 620, a ceramic tadpole gasket 622, and a retainer ring 624 as shown in FIG. 11. As suggested in FIG. 11, the ceramic tadpole gasket 622 may be supported by the mount ring 620 and the retainer ring 624, the retainer ring 624 may be received by the mount ring 620 to trap the ceramic tadpole gasket 622 between the mount ring 620 and the retainer ring 624, and a portion of the retainer ring 624 may be folded over the mount ring 620 to couple the retainer ring 624 to the mount ring 620.

The mount ring 620 may include a spring portion 628, a coupler portion 630, and a curved pusher portion 632 as shown in FIG. 11. The spring portion 628 may be formed to have a U-shaped cross-section that forms a retention channel 634 as shown in FIG. 11. The retention channel 634 may be sized to receive the retainer ring 624. The curved pusher portion 632 may engage a portion of the ceramic tadpole gasket 622 to position the ceramic tadpole gasket 622 between the mount ring 620 and the engine component 614.

The curved pusher portion 632 may extend around a portion of the ceramic tadpole gasket 622 to support the ceramic tadpole gasket 622 as shown in FIG. 11. The curved pusher portion 632 may be formed to include a number of pusher arms 668 as shown in FIG. 12. The pusher arms 668 may be spaced circumferentially about the mount ring 620. The curved pusher portion 632 may define an annular gasket channel 660 that blocks a compressible head 640 of the ceramic tadpole gasket 622 from moving away from the curved pusher portion 632. The annular gasket channel 660 may open radially outward toward the engine component 614.

The ceramic tadpole gasket 622 may include a compressible head 640 and a flat body 642 extending from the compressible head 640 as shown in FIG. 11. The compressible head 640 may be positioned in the annular gasket channel 660 and may be pushed by the mount ring 620 and the retainer ring 624 toward the engine component 614 to engage the engine component 614. The flat body 642 may extend from the compressible head 640 and may be trapped between the curved pusher portion 632 and a keeper portion 652 of the retainer ring 624 to block the compressible head 640 from moving away from the mount ring 620 and, thus, the engine component 614.

The flat body 642 may extend from the compressible head 640 and may be formed to have a relatively low profile relative to the compressible head 640 as shown in FIG. 11. The flat body 642 may be formed to include a number of circumferentially spaced receiver slots 670 as shown in FIG. 12. The receiver slots 670 may be sized to receive the pusher arms 668. The pusher arms 668 may extend through the receiver slots 670 and the flat body 642 may extend between the curved pusher portion 632 and the keeper portion 652. The flat body 642 may be trapped between the curved pusher portion 632 and the keeper portion 652 and, thus, the compressible head 640 may be blocked from moving relative to the mount ring 620.

The retainer ring 624 may include a spring portion 648, a coupler portion 650, and a keeper portion 652 as shown in FIG. 11. The keeper portion 652 may extend from the spring portion 648 of the retainer ring 624. The keeper portion 652 may be formed to include a number of keeper arms 672 as shown in FIG. 13. The keeper arms 672 may be spaced circumferentially about the retainer ring 624. The keeper arms 672 may be folded over the pusher arms 668 to couple the retainer ring to the mount ring 620 and trap the flat body 642 between the curved pusher portion 632 and the keeper portion 652.

A method for assembling the seal 616 is shown in FIGS. 12-15. The pusher arms 668 of the mount ring 620 may be pushed through the receiver slots 670 formed in the flat body 642 and the compressible head 640 may be positioned in the annular gasket channel 660 as suggested in FIG. 12. The retainer ring 624 may be inserted into the retention channel 634 formed by the mount ring 620 such that the flat body may be positioned between the curved pusher portion 632 and the keeper portion 652 as suggested in FIGS. 13 and 14. The keeper arms 672 may be then folded over the pusher arms 668 to trap the flat body 642 and block the flat body and, thus, the compressible head 640 from moving away from the mount ring 620 as shown in FIG. 15.

A seventh illustrative seal 716 incorporated into a seventh sealing assembly 710 is shown in FIGS. 16-20. The seal 716 and sealing assembly 710 are substantially similar to the seal 16 and sealing assembly 10 shown in FIGS. 1-4 and described herein. Accordingly, similar reference numbers in the 700 series indicate features that are common between the seal 16 and the seal 716 as well as between the sealing assembly 10 and the sealing assembly 710. The description of the seal 16 and sealing assembly 10 are hereby incorporated by reference to apply to the seal 716 and sealing assembly 710, except in instances when it conflicts with the specific description and drawings of the seal 716 and sealing assembly 710.

Figure 16:
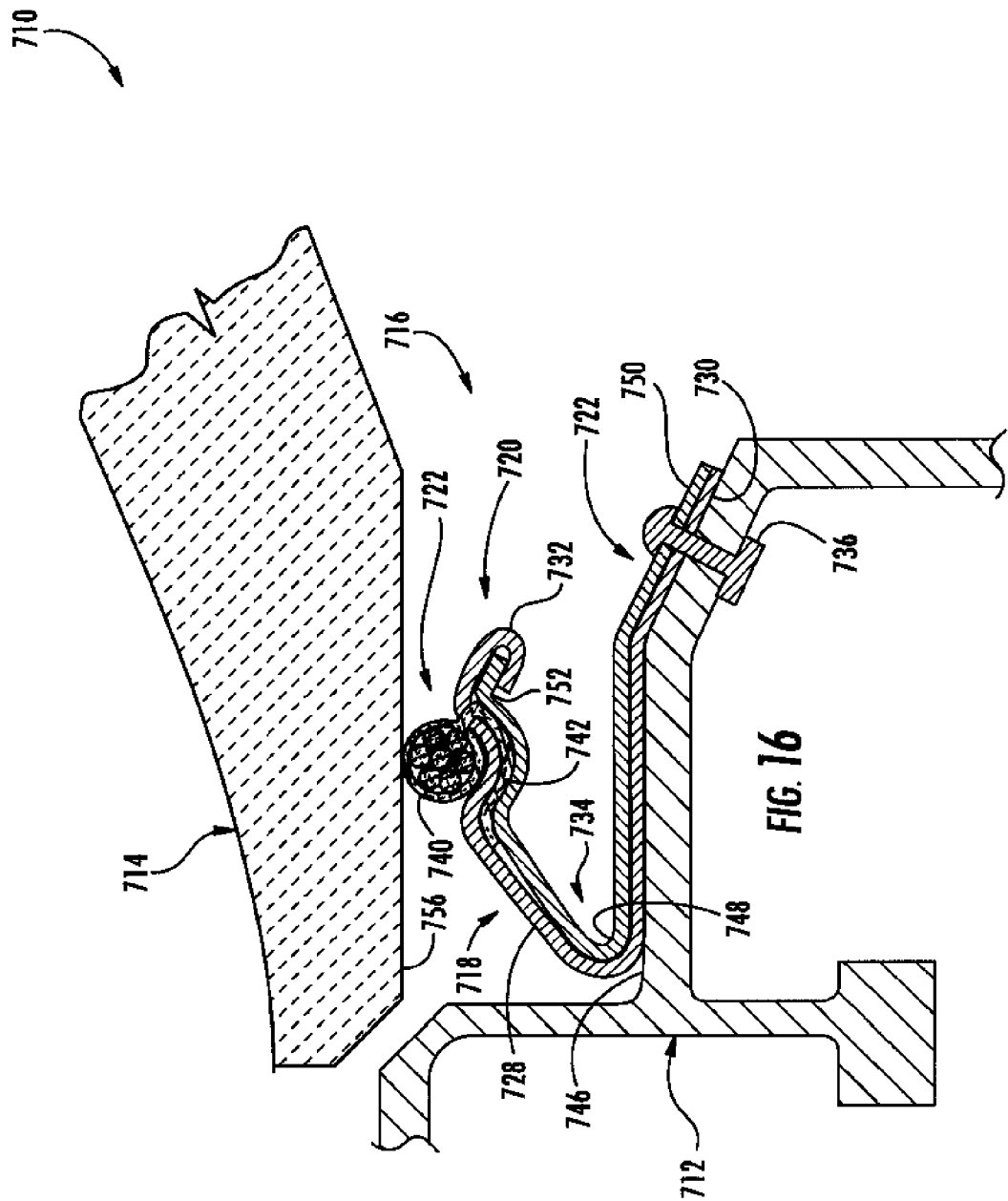
FIG. 16 is an enlarged cross-sectional view of a seventh embodiment of a seal adapted to be used in the sealing assembly of FIG. 1, the seal may include a mount ring formed to include a retainer channel, a ceramic tadpole gasket extending into the retainer channel, and a retainer ring received in the retainer channel of the mount ring to trap the ceramic tadpole gasket in the retainer channel, a portion of the mount ring may be folded over the retainer ring to block the ceramic tadpole gasket from moving relative to the mount ring.

In the seventh illustrative embodiment, the sealing assembly 710 may include an engine component 714, a support 712, and the seal 716 as shown in FIG. 16. The engine component 714 may be spaced apart from the support 712 radially to form a gap 718. The seal 716 may be arranged between the support 712 and the engine component 714 such that the seal 716 contacts an outer radial support-seal surface 746 of the support 712 and engages an inner radial component-seal surface 756 of the engine component 714.

The seal 716 may block movement of gasses through the gap 718 and may include a mount ring 720, a ceramic tadpole gasket 722, and a retainer ring 724 as shown in FIG. 16. As suggested in FIG. 16, the ceramic tadpole gasket 722 may be supported by the mount ring 720 and the retainer ring 724, the ceramic tadpole gasket 722 and the retainer ring 724 may be received by the mount ring 720 to trap the ceramic tadpole gasket 722 between the mount ring 720 and the retainer ring 724, and a portion of the mount ring 720 may be folded over the retainer ring 724 to couple the mount ring 720 to the retainer ring 724.

The mount ring 720 may include a spring portion 728, a coupler portion 730, and a curved pusher portion 732 as shown in FIG. 16. The spring portion 728 may be formed to have a U-shaped cross-section that forms a retention channel 734 as shown in FIG. 16. The retention channel 734 may be sized to receive a flat body 742 of the ceramic tadpole gasket 722 and the retainer ring 724. The curved pusher portion 732 may engage a portion of the ceramic tadpole gasket 722 to position the ceramic tadpole gasket 722 between the mount ring 720 and the engine component 714.

The curved pusher portion 732 may extend around a portion of the ceramic tadpole gasket 722 to support the ceramic tadpole gasket 722 as shown in FIG. 16. The curved pusher portion 732 may be formed to include a number of pusher arms 768 as shown in FIG. 17. The pusher arms 768 may be spaced circumferentially about the mount ring 720. The curved pusher portion 732 may define an annular gasket channel 760 that blocks a compressible head 740 of the ceramic tadpole gasket 722 from moving away from the curved pusher portion 732. The annular gasket channel 760 may open radially outward toward the engine component 714.

The ceramic tadpole gasket 722 may include a compressible head 740 and a flat body 742 extending from the compressible head 740 as shown in FIG. 16. The compressible head 740 may be positioned in the annular gasket channel 760 and may be pushed by the mount ring 720 and the retainer ring 724 toward the engine component 714 to engage the engine component 714. The flat body 742 may extend from the compressible head 740 and may be trapped between the curved pusher portion 732 and a keeper portion 752 of the retainer ring 724 to block the compressible head 740 from moving away from the mount ring 720 and, thus, the engine component 714.

The flat body 742 may be formed to include a number of circumferentially spaced receiver slots 770 as shown in FIG. 17. The receiver slots 770 may be sized to receive the pusher arms 768. The pusher arms 768 may extend through the receiver slots 770 and the flat body 742 may extend into the retention channel 734. The flat body 742 may be trapped between the mount ring 720 and the retainer ring 724 and, thus, the compressible head 740 may be blocked from moving relative to the mount ring 720.

The retainer ring 724 may include a spring portion 748, a coupler portion 750, and a keeper portion 752 as shown in FIG. 16. The keeper portion 752 may extend from the spring portion 748 of the retainer ring 724. The keeper portion 752 may be formed to include a number of keeper arms 772 as shown in FIG. 18. The keeper arms 772 may be spaced circumferentially about the retainer ring 724. The pusher arms 768 may be folded over the keeper arms 772 to couple the retainer ring 724 to the mount ring 720 and trap the flat body 742 in the retention channel 734.

A method for assembling the seal 716 is shown in FIGS. 16-20. The pusher arms 768 of the mount ring 720 may be pushed through the receiver slots 770 formed in the flat body 742 as suggested in FIG. 17. The compressible head 740 may be positioned in the annular gasket channel 760 and the flat body 742 may be positioned in the retention channel 734. The retainer ring 724 may be inserted into the retention channel 734 formed by the mount ring 720 such that the flat body 742 may be trapped between the mount ring 720 and the retainer ring 724 as suggested in FIGS. 13 and 14. The pusher arms 768 may be then folded over the keeper arms 772 to trap the flat body 742 and block the flat body 742 and, thus, the compressible head 740 from moving away from the mount ring 720 as shown in FIG. 20.

An eighth illustrative seal 816 incorporated into an eighth sealing assembly 810 is shown in FIGS. 21-25. The seal 816 and sealing assembly 810 are substantially similar to the seal 16 and sealing assembly 10 shown in FIGS. 1-4 and described herein. Accordingly, similar reference numbers in the 800 series indicate features that are common between the seal 16 and the seal 816 as well as between the sealing assembly 10 and the sealing assembly 810. The description of the seal 16 and sealing assembly 10 are hereby incorporated by reference to apply to the seal 816 and sealing assembly 810, except in instances when it conflicts with the specific description and drawings of the seal 816 and sealing assembly 810.

In the eighth illustrative embodiment, the sealing assembly 810 may include an engine component 814, a support 812, and the seal 816 as shown in FIG. 21. The engine component 814 may be spaced apart from the support 812 axially to form a gap 818. The seal 816 may be arranged between the support 812 and the engine component 814 such that the seal 816 contacts an outer radial support-seal surface 846 of the support 812 and engages an inner axial component-seal surface 856 of the engine component 814.

The seal 816 may block movement of gasses through the gap 818 and may include a mount ring 820, a ceramic tadpole gasket 822, and a retainer ring 824 as shown in FIG. 21. As suggested in FIG. 21, the ceramic tadpole gasket 822 may be supported by the mount ring 820 and the retainer ring 824, the ceramic tadpole gasket 822 and the retainer ring 824 may be received by the mount ring 820 to trap the ceramic tadpole gasket 822 between the mount ring 820 and the retainer ring 824, and a portion of the mount ring 820 may be folded over the retainer ring 824 to couple the mount ring 820 to the retainer ring 824.

The mount ring 820 may include a spring portion 828, a coupler portion 830, and a curved pusher portion 832 as shown in FIG. 21. The spring portion 828 may be formed to have an S-shaped cross-section that forms a retention channel 834 as shown in FIG. 21. The retention channel 834 may be sized to receive a flat body 842 of the ceramic tadpole gasket 822 and the retainer ring 824. The coupler portion 830 may include a number of lock tabs 874 that extend outwardly radially. The lock tabs 874 may be spaced apart circumferentially about mount ring 820.

The curved pusher portion 832 may engage a portion of the ceramic tadpole gasket 822 to position the ceramic tadpole gasket 822 between the mount ring 820 and the engine component 814 as shown in FIG. 21. The curved pusher portion 832 may be formed to include a number of pusher arms 868 as shown in FIG. 22. The pusher arms 868 may be spaced circumferentially about the mount ring 820. The curved pusher portion 832 may define an annular gasket channel 860 that blocks a compressible head 840 of the ceramic tadpole gasket 822 from moving away from the curved pusher portion 832. The annular gasket channel 860 may open axially outward toward the engine component 814.

The ceramic tadpole gasket 822 may include a compressible head 840 and a flat body 842 extending from the compressible head 840 as shown in FIG. 21. The compressible head 840 may be positioned in the annular gasket channel 860. The compressible head may be pushed by the mount ring 820 and the retainer ring 824 toward the engine component 814 to engage the engine component 814. The flat body 842 may extend from the compressible head 840.

The flat body 842 may be formed to include a number of circumferentially spaced receiver slots 870 as shown in FIG. 23. The receiver slots 870 may be sized to receive the pusher arms 868. The pusher arms 868 may extend through the receiver slots 870 and the flat body 842 may extend into the retention channel 834. The flat body 842 may be trapped between the mount ring 820 and the retainer ring 824 and, thus, the compressible head 840 may be blocked from moving relative to the mount ring 820.

The retainer ring 824 may include a spring portion 848, a coupler portion 850, and a keeper portion 852 as shown in FIG. 21. The spring portion 848 of the retainer ring 824 may be formed to have an S-shaped cross-section that is received in the retention channel 834 as shown in FIGS. 21 and 24. The coupler portion 850 may be formed to include a number of lock slots 876. The lock slots 876 may be sized to receive the lock tabs 874 of the coupler portion 830 of the mount ring 820. The lock slots may be spaced apart circumferentially about the retainer ring 824. The lock tabs 874 may extend through the lock slots 876 to couple the mount ring 820 to the retainer ring 824.

The keeper portion 852 may extend from the spring portion 848 of the retainer ring 824. The keeper portion 852 may be formed to include a number of keeper arms 872 as shown in FIG. 23. The keeper arms 872 may be spaced circumferentially about the retainer ring 824. The pusher arms 868 may be folded over the keeper arms 872 to couple the retainer ring 824 to the mount ring 820 and trap the flat body 842 in the retention channel 834.

A method for assembling the seal 816 is shown in FIGS. 22-25. The pusher arms 868 of the mount ring 820 may be pushed through the receiver slots 870 formed in the flat body 842 as suggested in FIG. 22. The compressible head 840 may be positioned in the annular gasket channel 860 and the flat body 842 may be positioned in the retention channel 834. The retainer ring 824 may be inserted into the retention channel 834 formed by the mount ring 820 such that the flat body 842 may be trapped between the mount ring 820 and the retainer ring 824 and the lock tabs 874 of the mount ring 820 may extend through the lock slots 876 of the retainer ring 824 as suggested in FIGS. 23 and 24. The pusher arms 868 may be then folded over the keeper arms 872 to trap the flat body 842 in the retention channel 834 and block the flat body 842 and, thus, the compressible head 840 from moving away from the mount ring 820 as shown in FIG. 25.

Figure 26:
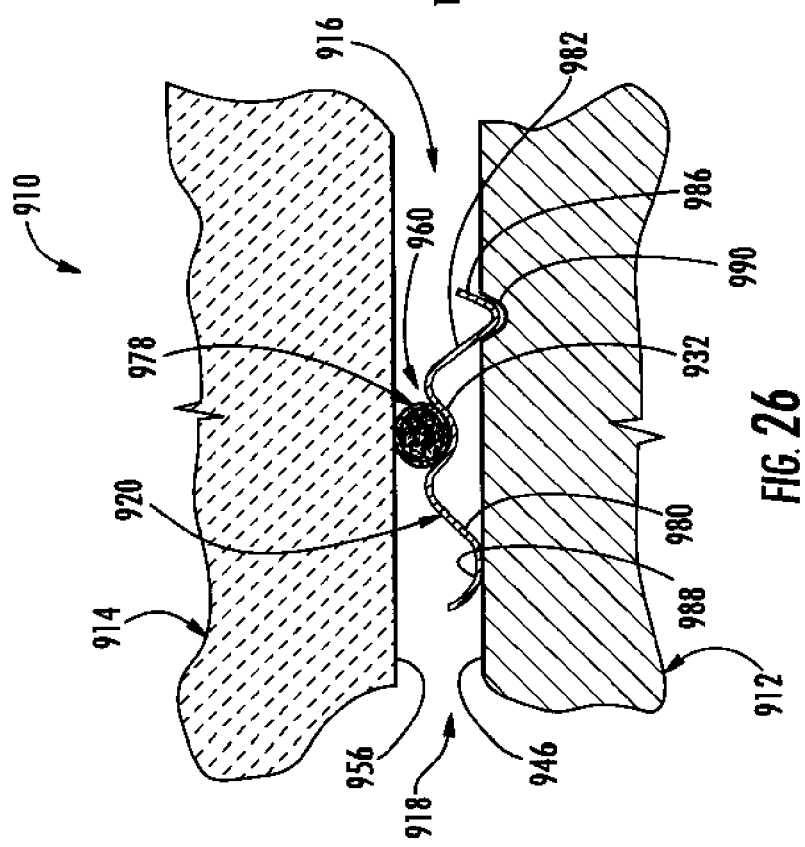
FIG. 26 is a cross-sectional elevation view of another embodiment of a sealing assembly that may include a support adapted to endure relatively low-temperatures, an engine component adapted to endure relatively high-temperatures and spaced from the support to create a gap, and a seal arranged between the support and the engine component to block gasses from passing through the gap and to insulate the support from the relatively high-temperature engine component.

Another sealing assembly 910 adapted for use in the gas turbine engine 110 is shown in FIG. 26. The sealing assembly 910 includes a support 912, an engine component 914, and the seal 916 as shown in FIG. 26. The support 912 may be made from a metallic material adapted for use in relatively low-temperature conditions. The engine component 914 may be made from a composite material adapted to withstand high-temperatures.

The engine component 914 may be mounted relative to the support 912 to define a gap 918 between the engine component 914 and the support 912 as shown in FIG. 26. The seal 916 may be arranged between the support 912 and the engine component 914 to block gasses from passing through the gap 918. The gap 918 may allow for variations in manufacturing tolerance of the adjacent components 912, 914 and may allow for expansion/contraction of the adjacent components 912, 914 that may occur during operation of the gas turbine engine 110 on account of temperature gradients throughout the engine 110.

The seal 916 may be adapted to compress and expand to fill the gap 918 during expansion and contraction of the adjacent components 912, 914 as suggested in FIG. 26. Expansion and contraction may occur during operation of the gas turbine engine 110 which may include the sealing assembly 910. The seal 916 may be arranged between the support 912 and the engine component 914 such that the seal 916 may contact an outer radial support-seal surface 946 of the support 912 and engage an inner axial component-seal surface 956 of the engine component 914.

The seal 916 may block movement of gasses through the gap 918 and may include a mount ring 920 and a ceramic gasket 978 as shown in FIG. 26. As suggested in FIG. 26, the ceramic gasket 978 may be pushed into engagement with the engine component 914 by the mount ring 920.

The mount ring 920 may be made of a metallic material as shown in FIG. 26. The mount ring 920 may be monolithically formed and may include a curved pusher portion 932, a sliding leg 980 extending from a first end of the curved pusher portion 932, and a notch leg 982 extending from a second end of the curved pusher portion 932. The curved pusher portion 932 may push the ceramic gasket 978 into engagement with the engine component 914. The sliding leg 980 may press the curved pusher portion 932 radially outwardly when the seal 916 is inserted into the gap 918. The notch leg 982 may be received by the support 912 to block the seal 916 from moving relative to the support 912.

The curved pusher portion 932 may be U-shaped and may define an annular gasket channel 960 as shown in FIG. 26. The annular gasket channel 960 may open outwardly radially toward the engine component 914. The curved pusher portion 932 may be sized such that portion of the ceramic gasket 978 received in the annular gasket channel 960 extends outwardly radially beyond the mount ring 920 and engages the engine component 914.

The sliding leg 980 may extend from a first end of the curved pusher portion 932 as shown in FIG. 26. The sliding leg 980 may define a curved slider 988 that opens outwardly toward the engine component 914. The curved slider 988 may slide on the support 912 as the seal 916 compresses and expands to fill the gap 918 during expansion and contraction of the adjacent components 912, 914 that occurs during operation of a gas turbine engine 110 including the sealing assembly 910. The sliding leg 980 may press the curved pusher portion 932 radially outwardly when the seal 916 is inserted into the gap 918.

The notch leg 982 may extend from a second end of the curved pusher portion 932 as shown in FIG. 26. The notch leg 982 may define a v-shaped end 986 received in an annular notch 990 formed in the support 912. The v-shaped end 986 may be received in the annular notch 990 to block the seal 916 from moving relative to the support 912.

Figure 27:
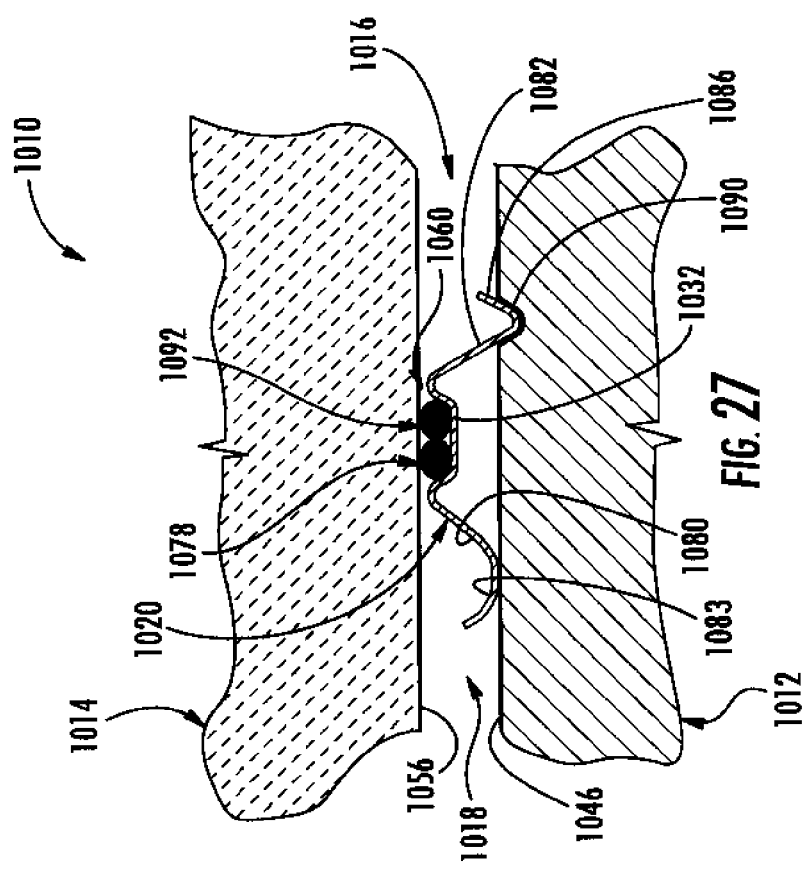
FIG. 27 is a cross-sectional elevation view of yet another embodiment of a sealing assembly that may include a support adapted to endure relatively low-temperatures, an engine component adapted to endure relatively high-temperatures and spaced from the support to create a gap, and a seal arranged between the support and the engine component to block gasses from passing through the gap and to insulate the support from the relatively high-temperature engine component.

Another illustrative seal 1016 incorporated into a sealing assembly 1010 is shown in FIG. 27. The seal 1016 is substantially similar to the seal 916 shown in FIG. 26 and described herein. Accordingly, similar reference numbers in the 1000 series indicate features that are common between the seal 916 and the seal 1016. The description of the seal 916 is hereby incorporated by reference to apply to the seal 1016, except in instances when it conflicts with the specific description and drawings of the seal 916.

In the tenth illustrative embodiment, the seal 1016 may include a mount ring 1020, a first ceramic gasket 1078, and a second ceramic gasket 1092 as shown in FIG. 27. The mount ring 1020 may include a curved pusher portion 1032, a sliding leg 1080 extending from a first end of the curved pusher portion 1032, and a notch leg 1082 extending from a second end of the curved pusher portion 1032.

The curved pusher portion 1032 may be U-shaped and may define an annular gasket channel 1060 as shown in FIG. 27. The annular gasket channel 1060 may open outwardly radially toward an engine component 1014. The curved pusher portion 1032 may be sized to receive a portion of the first and second ceramic gaskets 1078, 1092. The curved pusher portion 1032 may be sized such that a portion of the first and second ceramic gaskets 1078, 1092 extend outwardly radially beyond the mount ring 1020 and engage the engine component 1014.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A sealing assembly comprising
a support having a support-seal surface,
an engine component having a component-seal surface, the engine component mounted so that the component-seal surface is arranged in spaced-apart confronting relation with the support-seal surface to define a gap between the support and the engine component that grows and shrinks based on the temperature of the support and the engine component, and
a seal adapted to block gasses from passing through the gap between the support and the engine component, the seal including a mount ring coupled to the support and spaced apart from the engine component, a ceramic tadpole gasket having a compressible head held in contact with the engine component by the mount ring and a flat body extending from the compressible head into a retention channel formed by the mount ring, and a retainer ring arranged to extend into the retention channel of the mount ring to trap the flat body of the tadpole gasket in the retention channel formed by the mount ring so that the tadpole gasket is coupled to the mount ring,
wherein the mount ring includes a spring portion having a U-shaped cross-section and the spring portion is configured to push the compressible head of the ceramic tadpole gasket into contact with the engine component, the U-shaped cross-section of the spring portion included in the mount ring having legs that extend generally parallel to the component seal surface of the engine component.

2. The sealing assembly of claim 1, wherein the mount ring includes a coupler portion extending from the spring portion of the mount ring, the coupler portion of the mount ring is coupled to the support by fasteners that extend through the coupler portion of the mount ring and into the support, and the retainer ring includes a coupler portion that overlaps the coupler portion of the mount ring and through which the fasters extend.

3. The sealing assembly of claim 2, wherein the mount ring includes a curved pusher portion coupled to the spring portion, the curved pusher portion extends around a portion of the compressible head included in the tadpole gasket, and the curved pusher portion engages the compressible head.

4. The sealing assembly of claim 3, wherein the retainer ring includes a keeper portion arranged to extend outside the retention channel and the curved pusher portion of the mount ring and the keeper portion of the retainer ring cooperate to define a gasket channel sized to receive a portion of the compressible head and arranged to open toward the component-seal surface of the engine component.

5. The sealing assembly of claim 4, wherein the retainer ring includes a spring portion having a U-shaped cross-section and arranged to nest inside the spring portion of the mount ring so that the flat body of the tadpole gasket is trapped between the spring portion of the retainer ring and the spring portion of the mount ring.

6. The sealing assembly of claim 1, wherein the support-seal surface and the component-seal surface are continuous.

7. The sealing assembly of claim 1, wherein the support is made from a metallic material and the engine component is made from a composite material.

8. A seal adapted for use in a gas turbine engine, the seal comprising
a mount ring formed to include a retention channel,
a ceramic tadpole gasket having a compressible head and a flat body extending from the compressible head into the retention channel formed by the mount ring, and
a retainer ring arranged in the retention channel of the mount ring and sized to trap the flat body of the tadpole gasket in the retention channel formed by the mount ring so that the tadpole gasket is coupled to the mount ring,
wherein the mount ring includes a spring portion having a U-shaped cross-section forming legs and a bottom that interconnects the legs, and the bottom of the U-shaped cross-section of the spring portion included in the mount ring is spaced apart from the compressible head of the ceramic tadpole gasket.

9. The seal of claim 8, wherein the mount ring includes a coupler portion extending from the spring portion of the mount ring, the coupler portion of the mount ring is adapted to couple to a support by fasteners that extend through the coupler portion of the mount ring, and the retainer ring includes a coupler portion that overlaps the coupler portion of the mount ring and through which the fasters extend.

10. The seal of claim 8, wherein the mount ring includes a curved pusher portion coupled to the spring portion of the mount ring, the curved pusher portion extends around a portion of the compressible head included in the tadpole gasket, and the curved pusher portion is arranged to engage the compressible head.

11. The seal of claim 10, wherein the retainer ring includes a keeper portion arranged to extend outside the retention channel and blocks the compressible head of the tadpole gasket from movement away from the curved pusher portion of the mount ring.

12. The seal of claim 11, wherein the mount ring and retainer ring are annular and the curved pusher portion of the mount ring and the keeper portion of the retainer ring cooperate to define an annular gasket channel sized to receive a portion of the compressible head and arranged to open radially outward.

13. The seal of claim 11, wherein the mount ring and the retainer ring are annular and the retainer ring includes a spring portion having a U-shaped cross-section arranged to nest inside the spring portion of the mount ring so that the flat body of the tadpole gasket is trapped between the spring portion of the retainer ring and the spring portion of the mount ring.

14. The seal of claim 8, further comprising a staple extending through the flat body of the ceramic tadpole gasket and at least one of the mount ring and the retainer ring.

15. The seal of claim 8, further comprising ceramic paper located between the mount ring and the retainer ring.

16. The seal of claim 8, wherein the ceramic tadpole gasket further includes a retention tail coupled to the flat body opposite the compressible head.

17. A method of assembling a seal for a gas turbine engine comprising
positioning a flat body included in a ceramic tadpole gasket into a retention channel formed by a mount ring; the ceramic tadpole gasket including a compressible head and the flat body, and the flat body extending from the compressible head; and
inserting a retainer ring into the retention channel formed by the mount ring to trap the flat body of the ceramic tadpole gasket in the retention channel so that the ceramic tadpole gasket is coupled to the mount ring and the compressible head of the ceramic tadpole gasket is held in position by the mount ring,
wherein the mount ring includes a spring portion having a U-shaped cross-section forming legs and a bottom that interconnects the legs, and the bottom of the U-shaped cross-section of the spring portion included in the mount ring is spaced apart from the compressible head of the ceramic tadpole gasket.

18. The method of claim 17, further comprising fastening the flat body of the ceramic tadpole gasket to the mount ring with a staple.

* * * * *